(12) United States Patent
Jubert et al.

(10) Patent No.: US 12,412,598 B2
(45) Date of Patent: Sep. 9, 2025

(54) MEDIA UNDERLAYER STRUCTURE FOR HEAT-ASSISTED MAGNETIC RECORDING AND MEDIA FABRICATION METHODS THEREFOR

(71) Applicant: Western Digital Technologies, Inc., San Jose, CA (US)

(72) Inventors: Pierre-Olivier Jubert, San Jose, CA (US); Hoan Cong Ho, San Jose, CA (US); Paul Christopher Dorsey, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 154 days.

(21) Appl. No.: 18/383,638

(22) Filed: Oct. 25, 2023

(65) Prior Publication Data
US 2025/0078868 A1    Mar. 6, 2025

Related U.S. Application Data

(60) Provisional application No. 63/536,344, filed on Sep. 1, 2023.

(51) Int. Cl.
*G11B 5/66* (2006.01)
*G11B 5/85* (2006.01)
*G11B 5/00* (2006.01)

(52) U.S. Cl.
CPC ............... *G11B 5/672* (2021.05); *G11B 5/85* (2013.01); *G11B 2005/0021* (2013.01)

(58) Field of Classification Search
CPC ............ G11B 5/672; G11B 5/85; G11B 2005/0021; G11B 5/7369; G11B 5/7375
See application file for complete search history.

(56) References Cited

U.S. PATENT DOCUMENTS

| | | |
|---|---|---|
| 6,537,684 B1 | 3/2003 | Doerner et al. |
| 6,579,590 B2 | 6/2003 | Ju et al. |
| (Continued) | | |

FOREIGN PATENT DOCUMENTS

| | | |
|---|---|---|
| CN | 104364846 A | 2/2015 |
| JP | 5925907 B2 | 5/2016 |
| (Continued) | | |

OTHER PUBLICATIONS

Xu, Chengchao et al., "Understanding the Growth of High-Aspect-Ratio Grains in Granular L10-FePt Thin-Film Magnetic Media", APL Materials; May 2022; vol. 10, Issue 5; https://pubs.aip.org/aip/apm/article/10/5/051105/2834965/Understanding-the-growth-of-high-aspect-ratio; 17 pages.

(Continued)

*Primary Examiner* — Andrew Sasinowski
(74) *Attorney, Agent, or Firm* — LOZA & LOZA, LLP; Gabriel Fitch

(57) ABSTRACT

Various apparatuses, systems, methods, and media are disclosed for heat-assisted magnetic recording (HAMR) that includes a HAMR medium with a seed-thermal barrier structure. The seed-thermal barrier structure is positioned between a heat sink layer and a magnetic recording layer. In some examples, the seed-thermal barrier structure has a first layer including MgOTiO (MTO), a second layer including TiN on the first layer, a third layer on the second layer, and a fourth layer including MTO on the third layer. The third layer, in some examples, includes at least one of: RuAl, Pt, PtZr, PtTa, Rh, FePt, CrMo, or Cr.

20 Claims, 13 Drawing Sheets

(56) References Cited

U.S. PATENT DOCUMENTS

| | | | |
|---|---|---|---|
| 7,869,162 B2 | 1/2011 | Lu et al. | |
| 8,279,739 B2 | 10/2012 | Kanbe et al. | |
| 8,941,950 B2 | 1/2015 | Yuan et al. | |
| 8,993,134 B2 | 3/2015 | Varaprasad et al. | |
| 9,076,476 B2 | 7/2015 | Kryder et al. | |
| 9,177,585 B1 | 11/2015 | Seki et al. | |
| 9,368,142 B2 | 6/2016 | Chen et al. | |
| 9,406,329 B1* | 8/2016 | Ho | G11B 5/7375 |
| 9,530,445 B1 | 12/2016 | Grobis et al. | |
| 9,672,854 B2 | 6/2017 | Kubota et al. | |
| 9,754,618 B1 | 9/2017 | Srinivasan et al. | |
| 9,822,441 B2 | 11/2017 | Liu et al. | |
| 10,127,939 B2 | 11/2018 | Niwa et al. | |
| 10,255,939 B2 | 4/2019 | Hu et al. | |
| 10,276,201 B1 | 4/2019 | Srinivasan et al. | |
| 10,276,202 B1* | 4/2019 | Jubert | G11B 5/7369 |
| 10,347,281 B2 | 7/2019 | Arora et al. | |
| 10,439,133 B2 | 10/2019 | Apalkov et al. | |
| 10,453,487 B2 | 10/2019 | Kubota et al. | |
| 10,650,854 B1 | 5/2020 | Yuan et al. | |
| 10,923,150 B2 | 2/2021 | Moriya et al. | |
| 10,950,267 B1* | 3/2021 | Aoki | G11B 5/71 |
| 11,437,064 B1 | 9/2022 | Jubert et al. | |
| 11,521,648 B2 | 12/2022 | Ho et al. | |
| 11,521,658 B2 | 12/2022 | Choi et al. | |
| 11,900,978 B1* | 2/2024 | Ho | G11B 5/7375 |
| 2007/0148500 A1 | 6/2007 | Maeda et al. | |
| 2010/0255348 A1 | 10/2010 | Sato et al. | |
| 2013/0314815 A1 | 11/2013 | Yuan et al. | |
| 2014/0072828 A1 | 3/2014 | Inaba et al. | |
| 2014/0099517 A1 | 4/2014 | Hu et al. | |
| 2014/0127533 A1 | 5/2014 | Xiao et al. | |
| 2014/0335376 A1 | 11/2014 | Valaprasad et al. | |
| 2014/0376127 A1 | 12/2014 | Kanbe et al. | |
| 2015/0093598 A1 | 4/2015 | Kubota et al. | |
| 2016/0099016 A1 | 4/2016 | Kubota et al. | |
| 2016/0099017 A1 | 4/2016 | Hellwig et al. | |
| 2016/0358622 A1 | 12/2016 | Arora et al. | |
| 2017/0125050 A1 | 5/2017 | Kataoka et al. | |
| 2018/0040346 A1 | 2/2018 | Moriya et al. | |
| 2018/0218752 A1 | 8/2018 | Lu et al. | |
| 2018/0286441 A1 | 10/2018 | Lu | |
| 2023/0005503 A1 | 1/2023 | Wanami et al. | |
| 2024/0071416 A1 | 2/2024 | Ho et al. | |
| 2024/0096368 A1 | 3/2024 | Yuan et al. | |

FOREIGN PATENT DOCUMENTS

| | | | |
|---|---|---|---|
| JP | 6185591 B2 | 8/2017 | |
| JP | 2020164959 A | 10/2020 | |

OTHER PUBLICATIONS

Zhou, Bing et al., "Fabrication of FePt/FePt-BN/FePt-SiOx Granular Film for HAMR Media on Corning Lotus™ NXT Glass Substrate", IEEE Transactions on Magnetics; vol. 58, Issue 2; Feb. 2022; https://ieeexplore.ieee.org/document/9439521; 5 pages.

Zhou, Bing, "Development of L10-ordered FePt Thin Film for Magnetic Recording Application", Carnegie Mellon University; Materials Science and Engineering; Jun. 23, 2021; https://kilthub.cmu.edu/articles/thesis/Development_of_L10ordered_FePt_Thin_Film_for_Magnetic_Recording_Application/19229703; 24 pages.

Zhou, Bing et al., "Microstructure Analysis on Size Distribution During Film Growth in HAMR Media", IEEE Transactions on Magnetics; vol. 54, Issue 11; Nov. 2018; https://ieeexplore.ieee.org/document/8360133; 4 pages.

Hu, J.F et al., "Microstructure and Magnetic Properties of FePt—SiO2 Perpendicular Recording Media", Physica Status Solidi A: Applications and Materials Science; Oct. 2008; vol. 205, Issue 10; https://onlinelibrary.wiley.com/doi/abs/10.1002/pssa.200723037; 6 pages.

Granz, Steven D. et al., "Granular L10 FePt:X (X = Ag, B, C, SiOx, TaOx) Thin Films for Heat Assisted Magnetic Recording", The European Physical Journal B; Mar. 2013; vol. 86, Article 81; http://dx.doi.org/10.1140/epjb/e2012-30655-3; 7 pages.

Wei, D.H. et al., "Effects of SiO2 Inserted Layers on the Structure and Magnetic Properties of FePt (0 0 1) Films", Journal of Magnetism and Magnetic Materials; Sep. 2006; vol. 304, Issue 1; https://www.sciencedirect.com/science/article/abs/pii/S0304885306002629; 3 pages.

Yang, En et al., "L1o FePt-Oxide Columnar Perpendicular Media with High Coercivity and Small Grain Size", Journal of Applied Physics; Jul. 2008; vol. 104, Issue 2; https://pubs.aip.org/aip/jap/article-abstract/104/2/023904/934485/L1-FePt-oxide-columnar-perpendicular-media-with?redirectedFrom=fulltext; 3 pages.

Chen, S.C. et al., "Granular FePt—Ag Thin Films with Uniform FePt Particle Size for High-Density Magnetic Recording", Materials Science and Engineering: B; Jan. 2002; vol. 88, Issue 1; https://www.sciencedirect.com/science/article/abs/pii/S0921510701009151; 7 pages.

Sepehri-Amin, H. et al., "Microstructure and magnetic properties of FePt-(C,SiO2) granular films deposited on MgO, MgTiO, and MgTiON underlayers", Scripta Materialia; vol. 157; Dec. 2018; https://doi.org/10.1016/j.scriptamat.2018.07.025; 5 pages.

Hung, Shih-Hsuan et al., "First-principles prediction of the morphology of L10 FePt nanoparticles supported on Mg(Ti)O for heat-assisted magnetic recording applications", Physical Review Materials; Jul. 12, 2017; https://journals.aps.org/prmaterials/pdf/10.1103/PhysRevMaterials.1.024405; 6 pages.

Deng, J. Y. et al., "Effect of TiON—MgO intermediate layer on microstructure and magnetic properties of L10 FePt—C—SiO2 films", Journal of Magnetism and Magnetic Materials; vol. 417; Nov. 1, 2016; https://doi.org/10.1016/j.mmm.2016.05.096; 13 pages.

Tsai, Jai-Lin et al., "Switching Field Distribution in BN/FePICAg/MgTION and FePtCAg/MgTiOBN Films", Nanomaterials; Mar. 6, 2022; https://doi.org/10.3390/nano12050874; 13 pages.

Hung, Shih-Hsuan, "Shaping Nanostructure Using Molecules", University of New York; Department of Physics; Dec. 2018; https://etheses.whiterose.ac.uk/23493/1/Shih-Hsuan-Hung-Final-Thesis.pdf, 159 pages.

Ho, Hoan, "Control of Microstructure, Texture and Magnetic Properties of L10FePt Granular Magnetic Recording Media", Carnegie Mellon University; ProQuest Dissertations Publishing; Apr. 2014; https://www.proquest.com/openview/69daf59548ac85e58164e3a80ae83bcb/1?pq-origsite=gscholar&cbl=18750; 24 pages.

Samad, Mohammed Abdul et al., "A Novel Approach of Carbon Embedding in Magnetic Media for Future Head/Disk Interface", IEEE Transactions on Magnetics; vol. 48, Issue 5; May 2012; https://ieeexplore.ieee.org/document/6187782; 6 pages.

Shiroyama, T et al., "Influence of MgO underlayers on the structure and magnetic properties of FePt—C hanogranular films for heat-assisted magnetic recording media"; AIP Advances; Oct. 2016; https://doi.org/10.1063/1.4964930; 11 pages.

Xu, Baoxi et al., "HAMR Media Design in Optical and Thermal Aspects"; IEEE Transactions on Magnetics; vol. 49, Issue 6; Jun. 2013; https://ieeexplore.ieee.org/document/6522295; 6 pages.

Choi, Jina et al., "Effects of Single Metal-Ion Doping on the Visible-Light Photoreactivity of TiO2"; American Chemical Society; 2010; https://pubs.acs.org/doi/10.1021/jp908088x; 10 pages.

International Search Report and Written Opinion for International Application No. PCT/US22/27235, dated Aug. 11, 2022, 10 pages.

Tsai, Jai-Lin et al., "Influence of an MgTiTaON Inserted Layer on Magnetic Properties and Microstructure of FePtAgC Films", Coatings; Apr. 8, 2019; https://doi.org/10.3390/coatings9040238; 11 pages.

Hu, J. F. et al., "HAMR Medium Structure Design and its Process for Excellent Thermal Performance", IEEE Transactions on Magnetics; vol. 50, Issue 3; Mar. 2014; https://ieeexplore.ieee.org/document/6774999; 6 pages.

Jubert, Pierre-Olivier et al., "Optimizing the Optical and Thermal Design of Heat-Assisted Magnetic Recording Media", IEEE Transactions on Magnetics; vol. 53, Issue 2; Feb. 2017; https://ieeexplore.ieee.org/document/7556254; 9 pages.

Pandey, H. et al., "Structure Optimization of FePt—C Nanogranular films for Heat Assisted Magnetic Recording Media"; IEEE Trans-

(56) References Cited

OTHER PUBLICATIONS actions on Magnetics; vol. 52, Issue 2; Feb. 2016; https://ieeexplore.ieee.org/document/7247737; 8 pages.
Hono, Kazuhiro, "FePt Nanogranular films for high density heat-assisted magnetic recording", Microelectronics & Nanoelectronics; 2022 Merck KGaA; Darmstadt, Germany; accessed Feb. 5, 2022; https://www.sigmaaldrich.com/US/en/technical-documents/technical-article/materials-science-and-engineering/microelectronics-and-nanoelectronics/fept-nanogranular-films; 4 pages.
Zhou, Bing et al., "The utilization of boron nitride (BN) for granular L10-FePt HAMR media fabrication", Applied Physics Letters; vol. 118, Issue 16; Apr. 21, 2021; https://doi.org/10.1063/5.0045901; 6 pages.

\* cited by examiner

MEDIA UNDERLAYER STRUCTURE FOR HEAT-ASSISTED MAGNETIC RECORDING AND MEDIA FABRICATION METHODS THEREFOR

CROSS-REFERENCE TO RELATED APPLICATIONS

This application claims priority under 35 U.S.C. § 119 to U.S. Provisional Patent Application No. 63/536,344 filed on Sep. 1, 2023, entitled, "MEDIA UNDERLAYER STRUCTURE FOR HEAT-ASSISTED MAGNETIC RECORDING AND MEDIA FABRICATION THEREFOR," the entire content of which is incorporated herein by reference as if fully set forth below in its entirety and for all applicable purposes.

FIELD

The disclosure relates, in some aspects, to magnetic recording media for use with heat-assisted magnetic recording (HAMR), and more particularly, to a magnetic recording media with a seed-thermal barrier underlayer structure configured for HAMR and to media fabrication therefor.

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high definition television (HDTV) receivers, vehicle control systems, cellular or mobile telephones, television set-top boxes, digital cameras, digital video cameras, video game consoles, network storage systems, and portable media players.

A typical disk drive includes magnetic storage media in the form of one or more flat disks. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic moments stored on the recording layer of the media.

Energy-assisted magnetic recording (EAMR) systems can increase the areal density of information recorded magnetically on various magnetic media. To achieve higher areal density for magnetic storage, smaller magnetic grain size (e.g., less than 6 nanometers (nm)) media may be used. Heat-assisted magnetic recording (HAMR) is an example of EAMR. In HAMR, high temperatures are applied to the recording media during writing to facilitate recording to small magnetic grains.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one embodiment, a magnetic recording medium includes a substrate, a heat sink layer on the substrate, and an underlayer structure on the heat sink layer. The underlayer structure includes a first layer comprising MgOTiO (MTO) on the heat sink layer, a second layer comprising TiN on the first layer, a third layer on the second layer, and a fourth layer including MTO on the third layer. A magnetic recording layer structure is on the fourth layer.

In one embodiment, a data storage device includes the magnetic recording medium described hereinabove, and a write head configured to write data to the magnetic recording medium. The write head includes a near field transducer (NFT).

In one embodiment, a magnetic recording medium includes a substrate; a heat sink layer on the substrate; and a first MgOTiO (MTO) layer on the heat sink layer, wherein the first MTO layer includes MTO. In this embodiment, a first TiN layer is directly on the first MTO layer, wherein the first TiN layer includes TiN. A first middle thermal barrier layer is directly on the first TiN layer, and a second MTO layer is directly on the first middle thermal barrier layer, wherein the second MTO layer includes MTO. A magnetic recording layer structure is on the second MTO layer.

In one embodiment, a method for manufacturing a magnetic recording medium is provided. The method includes providing a substrate, providing a heat sink on the substrate, and providing a first layer comprising MgOTiO (MTO) on the heat sink. The method further includes causing a reactive gas comprising $N_2$ to flow in a chamber containing the first layer to form a second layer on the first layer, wherein the second layer includes TiN. The method further includes providing a third layer on the second layer, providing a fourth layer comprising MTO on the third layer, and providing a magnetic recording layer structure on the fourth layer.

In one embodiment, a magnetic recording medium is formed using the method described hereinabove.

These and other aspects of the disclosure will become more fully understood upon a review of the detailed description which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are therefore not to be considered limiting of its scope, the disclosure is described and explained with additional specificity and detail through the use of the accompanying drawings, in which.

DETAILED DESCRIPTION

Figure 1:
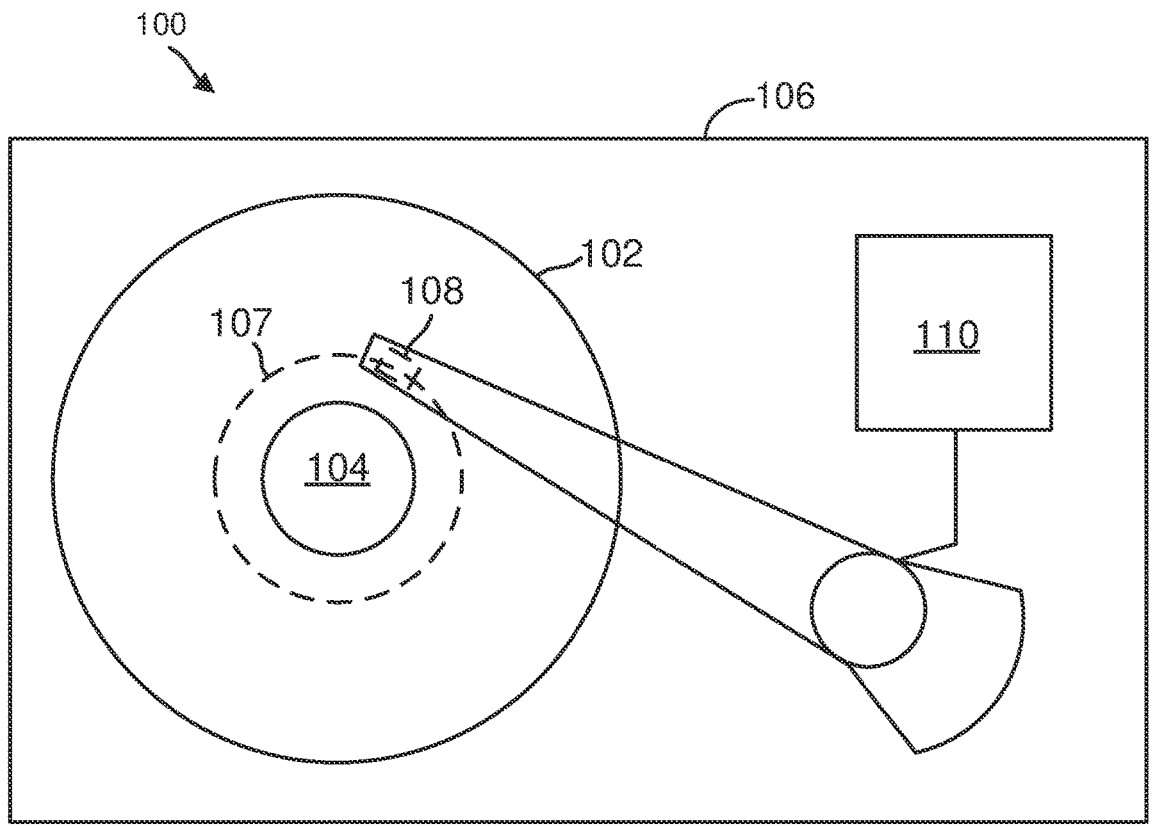
FIG. 1 is a top schematic view of a disk drive configured for heat-assisted magnetic recording (HAMR) including a slider and a HAMR medium in accordance with some aspects of the disclosure.

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects or embodiments of like elements.

Heat assisted magnetic recording is based on locally heating the recording layer above its Curie temperature during the write process. The temperature rise needs to be local and with large lateral gradient to enable high density magnetic recording. The heat flow upon excitation with the write head near field transducer is controlled by the optical and thermal properties of the medium stack and in particular by a seed-thermal barrier layer positioned between the recording layer and the heatsink layer(s). The seed-thermal barrier layer may also be referred to as a thermal barrier layer, a seed layer, or an underlayer.

The seed-thermal barrier layer has additional requirements beyond its thermal properties. This layer is also the seed for epitaxial growth of the magnetic recording layer, and in specific, a L10-FePt granular recording layer. Its optical properties may also define the near field transducer (NFT, the optical transducer of the head that heats the media) to media optical coupling efficiency. In addition, this seed-thermal barrier layer provides stability during drive operations. The selection of the materials and fabrication process constituting this layer can therefore be very important for the fabrication of the HAMR medium.

Proposed seed underlayers for HAMR media have initially been based on use of a magnesium oxide ("MgO") crystallographic layer, which promotes good crystallographic growth of the magnetic recording layer, and specifically, the L10-FePt grains of the magnetic recording layers. In addition, in spite of its relatively high thermal conductivity, MgO has a large interface thermal resistance to FePt, which makes it a good thermal barrier. However, the MgO layer is prone to causing corrosion and is the most significant contributor to corrosion in HAMR media due to the reactivity of MgO to moisture in the air. Voids and micropores in the recording layer and overcoat are the paths for moisture to reach the MgO layer. The corrosion may lead to surface defects which can cause severe head-disk interface issues, including damage to the head or media surfaces.

An improved material for the seed-thermal barrier layer may include a mixture of MgO and TiO ("MTO") which exhibits less corrosion than an MgO layer. MTO has a lower thermal conductivity than MgO, but its interface thermal resistance to FePt is lower than that of MgO. As a result, use of an MTO layer results in a lower overall thermal barrier resistance in comparison to use of an MgO layer. One possible solution to the problem of lower thermal barrier resistance includes use of an MTO/MgO bilayer under the magnetic recording layer, which increases the total thermal barrier resistance compared to use of a single MTO layer, but this solution does not avoid the corrosion problem caused by an MgO layer.

To address these problems, embodiments of new HAMR media with an improved seed-thermal barrier underlayer or structure are described herein. The improved seed-thermal barrier structure may include (1) a first MTO layer, (2) a TiN layer, (3) a middle thermal barrier layer, and (4) a second MTO layer. The middle thermal barrier layer may include a metal or an alloy, such as RuAl, or other suitable material. This seed-thermal barrier structure includes new layer to layer interfaces, e.g., the MTO/TiN/RuAl interface, and the MTO/RuAl interface. These new interfaces introduce additional thermal resistance such that this seed-thermal barrier structure has significantly more thermal resistance than a single underlayer of MTO or an MTO/MgO bilayer. The increased thermal resistance of this seed-thermal barrier structure leads to a lower power requirement for the head laser which drastically improves the HAMR head lifetime and system reliability. As such, this new highly resistive, seed-thermal barrier structure enables HAMR recording with high temperature gradients but at lower required laser power.

In addition, in unexpected results, it was found that the use of the TiN layer between the first MTO layer and the middle thermal barrier layer increased the signal to noise ratio when writing (SNRwr) to the HAMR medium, e.g., in comparison to use of the middle thermal barrier layer alone between the first and second MTO layers (e.g., without the TiN layer in the underlayer structure). As such, this new seed-thermal barrier structure has similar or better performance attributes to a single underlayer of MTO.

Moreover, this new seed-thermal barrier structure is equivalent to a single MTO layer in terms of its promotion of good L10-FePt ordering and optical coupling to the NFT. And this seed-thermal barrier structure does not include an MgO layer and therefore reduces the corrosion problem. As such, this new seed-thermal barrier structure maintains or improves the SNR performance in comparison to a single underlayer of MTO and exhibits an increased thermal resistance and a lower laser power requirement.

FIG. 1 is a top schematic view of a data storage device 100 (e.g., disk drive or magnetic recording device) configured for heat-assisted magnetic recording (HAMR) comprising a slider 108 and a magnetic recording medium 102 according to one or more aspects of the disclosure. For simplicity of illustration, the various embodiments of the magnetic recording medium 12 will be described in this disclosure as usable for heat-assisted magnetic recording (HAMR), though they are not limited to HAMR or EAMR only and can be used for non-EAMR type magnetic recording. A laser (not visible in FIG. 1 but shown as 114 in FIG. 2) is positioned with a head/slider 108. Disk drive 100 may include one or more disks/media 102 to store data, wherein the disks/media include one or more embodiments herein. Disk/medium 102 resides on a spindle assembly 104 that is mounted to a drive housing 106. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives.

Figure 2:
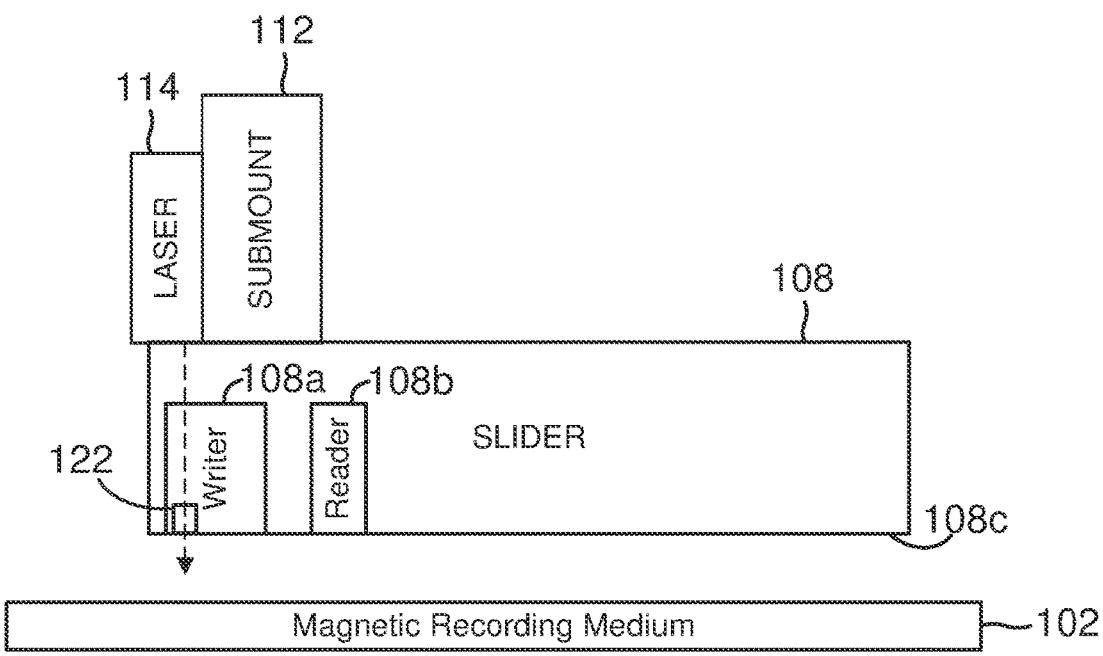
FIG. 2 is a side schematic view of the slider and HAMR medium in accordance with some aspects of the disclosure.
Figure 3:
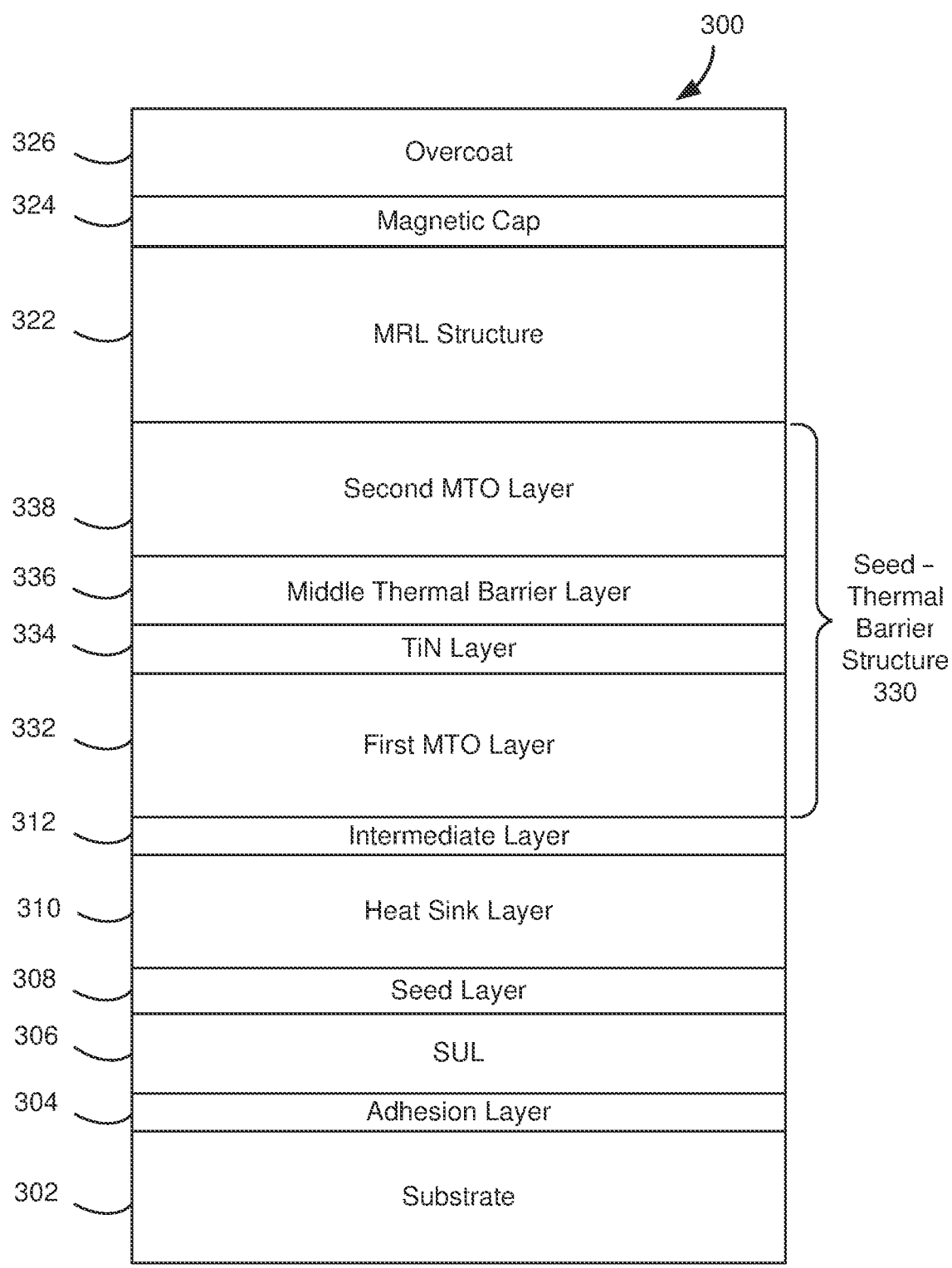
FIG. 3 is a side schematic view of an exemplary HAMR medium in accordance with some aspects of the disclosure.
Figure 12:
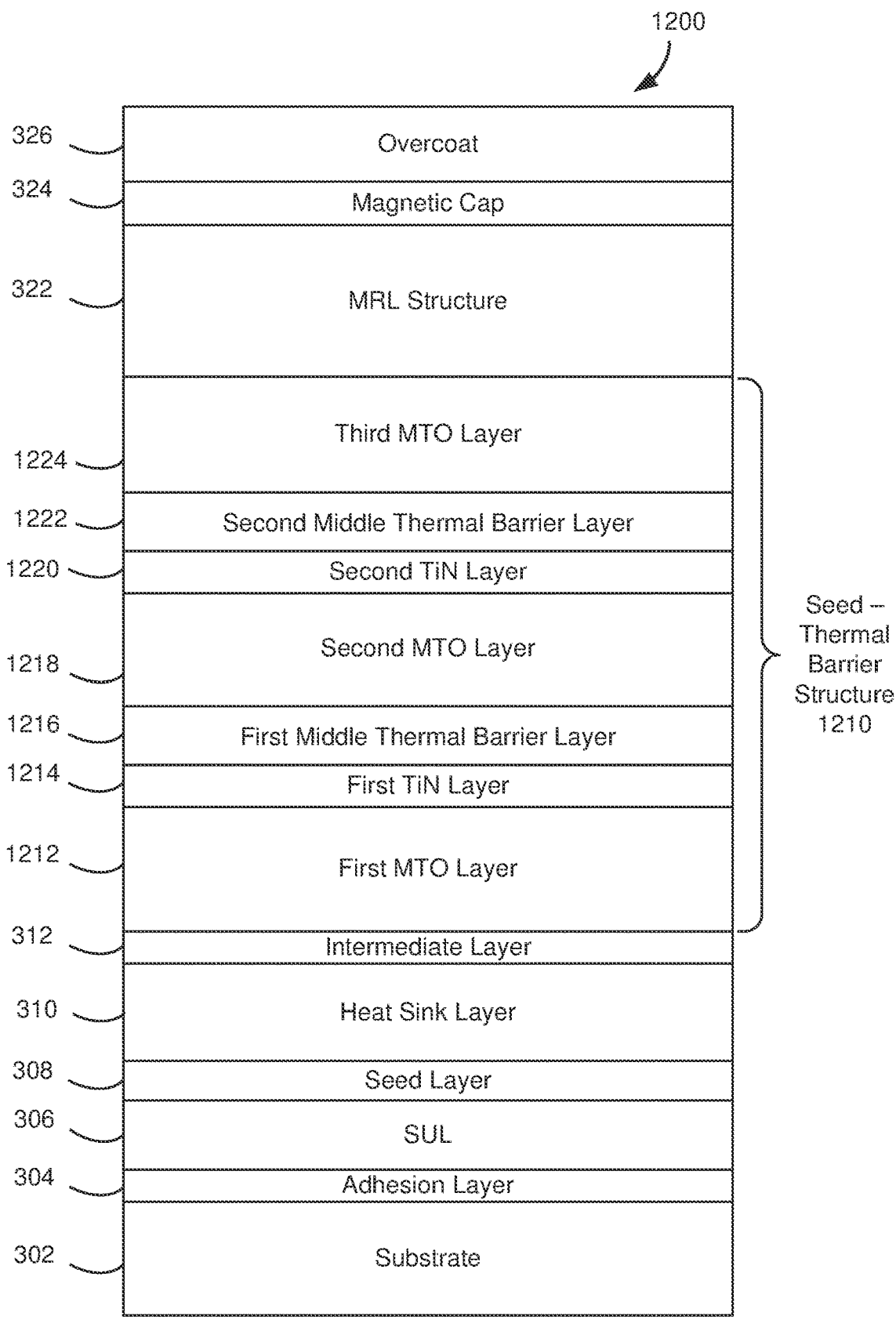
FIG. 12 is a side schematic view of another exemplary HAMR medium in accordance with some aspects of the disclosure.

FIG. 2 is a side schematic view of the slider 108 and magnetic recording medium 102 of FIG. 1. The magnetic recording medium 102 may include an improved seed-thermal barrier structure (e.g., as shown in FIGS. 3 and 12) in accordance with one or more aspects of the disclosure. The slider 108 may include a sub-mount 112 attached to a top surface of the slider 108. The laser 114 may be attached to the sub-mount 112, and possibly to the slider 108. The slider 108 comprises a write element (e.g., writer) 108a and a read element (e.g., reader) 108b positioned along an air bearing surface (ABS) 108c of the slider for writing information to, and reading information from, respectively, the magnetic recording medium 102.

In operation, the laser 114 is configured to generate and direct light energy to a waveguide (e.g., along the dashed line) in the slider 108 which directs the light to a near field transducer (NFT) 122 near the air bearing surface (e.g., bottom surface) 108c of the slider 108. Upon receiving the light from the laser 114 via the waveguide, the NFT 122 generates localized heat energy that heats a portion of the magnetic recording medium 102 within or near the write element 108a, and near the reader element 108b. The anticipated recording temperature can be in the range of about 350° C. to 400° C. In the aspect illustrated in FIG. 2, the laser directed light is disposed within the writer 108a and near a trailing edge of the slider 108. In other aspects, the laser directed light may instead be positioned between the writer 108a and the reader 108b. FIGS. 1 and 2 illustrate a specific example of a HAMR system. In other examples, the magnetic recording medium 102, including the seed-thermal barrier structure according to aspects described herein, can be used in other suitable HAMR systems (e.g., with other sliders configured for HAMR).

FIG. 3 is a side schematic view of a magnetic recording medium 300 with an improved seed-thermal barrier structure 330 for use in a HAMR system or other type of EAMR system in accordance with some aspects of the disclosure. The magnetic recording medium 300 has a stacked structure with a substrate 302 at a bottom/base layer, an adhesion layer 304 on the substrate 302, a soft underlayer (SUL) 306 on the adhesion layer 304, a seed layer 308 on the SUL 306, a heat sink layer 310 on the seed layer 308, an intermediate layer 312 on the heat sink layer 310, the seed-thermal barrier structure 330 on the intermediate layer 312, a magnetic recording layer (MRL) structure 322 on the seed-thermal barrier structure 330, a magnetic cap layer 324 (e.g., capping layer) on the MRL structure 322, and an overcoat layer 326 on the magnetic cap layer 324. In some examples, the magnetic recording medium 300 may also have a lubricant layer (not shown) of polymer based lubricants on the overcoat layer 326.

The terms "above." "below," "on." and "between" as used herein refer to a relative position of one layer with respect to other layers. As such, one layer deposited or disposed or positioned on, above, or below another layer may be directly in contact with the other layer or may have one or more intervening layers. Moreover, one layer deposited or disposed between layers may be directly in contact with the layers or may have one or more intervening layers. A layer described as directly on another layer is directly in contact with the another layer without one or more intervening layers. In other aspects, one or more fewer layers or additional layers than shown in FIG. 3 may be provided in the magnetic medium 300.

In some aspects, the substrate 302 may have a disk shape with a generally planar surface with an outer diameter of about 97 mm and a thickness of about 0.5 mm, e.g., for a 3.5 inch hard disk drive. In other examples, the substrate 302 may have an outer diameter of 95 mm or 95.1 mm or may have other dimensions or shapes. In some aspects, the substrate 302 may be made of one or more materials, such as an Al alloy. NiP plated Al, glass, glass ceramic, silicon, silicon-carbide, and/or combinations thereof.

In some aspects, the adhesion layer 304 (which might alternatively be referred to as a pre-seed layer) is used to reduce delamination of layers or films deposited over the adhesion layer. The adhesion layer may include a metallic alloy, such as CrTa or NiTa and/or other suitable materials known in the art.

In some aspects, the SUL 306 may include a magnetically permeable material that serves as a flux return path for the magnetic flux from the write head, such as NiFe, CoNbB, FeAlSi, CoFeB, FeTaN, FeTaC, CoFe, CoZrWMo, CoW, CoNiFe, or other suitable materials known in the art. The SUL 306 may be multilayered or a single layer.

In some aspects, the seed layer 308 may include RuAl, NiAl, and/or other suitable materials known in the art. In some aspects, the heat sink layer 310 may include one or more layers and be made of one or more materials with high thermal conductivity, such as Ag, Al, Au, Cu, Cr, Mo, Ru, W, CuZr, MoCu, AgPd, CrRu, CrV, CrW, CrMo, CrNd, NiAl, NiTa, combinations thereof, and/or other suitable materials known in the art. The heat sink layer 310 facilitates the transfer of heat away from the MRL structure 322 when data is written to the medium 300. The intermediate layer 312 is on the heat sink layer 310 and may be made of RuAl, RuAlTiO2, and/or other suitable materials known in the art. The intermediate layer 312 is optional, and when not present, the seed-thermal barrier structure 330 is directly on the heat sink layer 310.

In some aspects, the MRL structure 322 may include a continuous granular recording layer or one or more magnetic recording layers with different compositions. In some aspects, the MRL structure 322 may be made of a FePt alloy or an alloy selected from FePtX, where X is a material selected from Cu, Ni, and combinations thereof. In some aspects, the MRL structure 322 may be made of FePd, CoPt, or MnAl, or possibly a CoPt/CoPd multilayer alloy, each layer having a predetermined thickness, granular structure, small grain size, desired uniformity, high coercivity, high magnetic flux, and good atomic ordering, as would be appropriate for HAMR media. In particular, the MRL structure may include FePt (and CoPt) alloys ordered in $L1_0$ that are known for their high uniaxial magneto-crystalline anisotropy and magnetization, desirable properties for magnetic recording media. Other additive elements may be added to the MRL structure 322 including, e.g., Ag, Au, Cu, Ni, $SiO_2$, BN, $TiO_2$, C, or other suitable materials. These additive elements may act as segregants to form grain boundaries around grains made of FePt or other suitable magnetic grain alloys.

In some aspects, the magnetic cap layer 324 may be made of Co, CoPt, CoFe, or CoPd. In one example, the magnetic cap layer 324 can be a multi-layer structure having a layer including Co and Pt/Pd. In some embodiments, the magnetic cap layer 324 may be made of specific combinations of materials, for example, Co/Au, Co/Ag, Co/Al, Co/Cu, Co/Ir, Co/Mo, Co/Ni, Co/Os, Co/Ru, Co/Ti, Co/V, Fe/Ag, Fe/Au. Fe/Cu, Fe/Mo. Fe/Pd, Ni/Au, Ni/Cu, Ni/Mo, Ni/Pd. Ni/Re, etc. In additional examples, multi-layer structure materials may include any combination of Pt and Pd (e.g., alloys), or any of the following elements, alone or in combination; Au, Ag, Al, Cu, Ir, Mo, Ni, Os, Ru, Ti, V. Fe, Re, and the like. In some aspects, the overcoat layer 326 may be made of carbon.

In some aspects herein, the improved seed-thermal barrier structure 330 includes a plurality of layers. A first MTO layer 332 of the seed-thermal barrier structure 330 is positioned on the intermediate layer 312, when present, and in some aspects positioned directly on the intermediate layer 312. When the intermediate layer is not present, the first MTO layer 332 may be positioned on or directly on the heat sink layer 310. The first MTO layer 332 includes a mixture of MgO and TiO (MTO). In one example, the percentage $P_{TiO}$ of TiO in the MTO mixture is in a range of 30 mole percent (mol %) to 90 mol % or in another example, the percentage $P_{TiO}$ of TiO in the MTO mixture is 50 mol %.

In some aspects, a TiN layer 334 is formed on (or directly on) the first MTO layer 332 and includes a mixture of Ti and N (TiN). In one aspect, the TiN layer 334 is formed by exposing the first MTO layer 332 to N2 gas such that Ti from the first MTO layer 332 mixes and/or bonds with the N2 gas to form the TiN layer 334.

A middle thermal barrier layer 336 (e.g., third layer in the seed thermal barrier structure) is disposed on (or directly on) the TiN layer and includes one or more metals or other materials that form a high thermal resistance interface with the first MTO layer 332 and/or the second MTO layer 338 and provides a good seed layer for the second MTO layer 338. In some embodiments, the middle thermal barrier layer 336 may include a mixture of Ru and Al (RuAl). In other embodiments, the middle thermal barrier layer 336 may include Pt or a Pt alloy, wherein the Pt alloy may include PtZr, PtTa, or another Pt alloy. In another embodiment, the middle thermal barrier layer 336 may include Rh or Cr. In another embodiment, the middle thermal barrier layer 336 may include a mixture of Fe and Pt (FePt). In another embodiment, the middle thermal barrier layer 336 may include a mixture of Cr and Mo (CrMo). These metals and alloys were found to have interfaces with an MTO layer that exhibit high thermal resistance, as shown in the table below.

TABLE 1

Thermal Resistance of Various MTO Interfaces

| Interface Type | Thermal Resistance $R_{TH}$ ($m^2K/GW$) |
|---|---|
| Cr/MTO Interface | 0.99 |
| FePt/MTO Interface | 1.77 |
| Rh/MTO Interface | 1.77 |
| RuAl/MTO Interface | 1.84 |
| Pt/MTO Interface | 2.51 |

Table 1 shows the thermal resistance $R_{TH}$ in meters squared Kelvin per gigawatt ($m^2K/GW$) for different interfaces with an MTO layer. It was found that the RuAl/MTO interface had a high thermal resistance (e.g., $R_{TH}$=1.84 $m^2K/GW$), and also RuAl provided a good seed layer to MTO by promoting a good crystallography for MTO. The Pt/MTO interface had a higher thermal resistance (e.g., $R_{TH}$=2.51 $m^2K/GW$) than the RuAl/MTO interface, however Pt was found to not maintain a good crystallography for MTO. One or more Pt alloys, such as PtZr, PtTa, or another Pt alloy may provide an improved seed layer for MTO and a high thermal resistance interface with MTO. The materials Rh, FePt, and Cr also had high thermal resistance interfaces with MTO and would be good options as well for the middle seed thermal barrier 336. In another embodiment, the middle thermal barrier layer 336 may include one or more of these metals and/or another metal or metal alloy or other suitable material(s).

A second MTO layer 338 is disposed on (or directly on) the middle thermal barrier layer 336 and includes a mixture of MgO and $TiO_2$ (MTO). In one example, the percentage $P_{TiO}$ of TiO in the MTO mixture is in a range of 30 mole percent (mol %) to 90 mol % or in another example, the percentage $P_{TiO}$ of TiO in the MTO mixture is 50 mol %. This second MTO layer 338 may function as a seed layer to facilitate the formation of the MRL structure 322. Although the first MTO layer 332 and the second MTO layer 338 may be formed of the same materials, the two MTO layers do not need to include the same materials and, in some examples, the two MTO layers may be formed of different materials or may have different percentages $P_{TiO}$ of TiO in their MTO mixtures. In some examples, the two MTO layers have the same composition and in other examples, they may have different compositions (e.g., different percentages of constituent materials).

In one or more aspects herein, the layers in the seed thermal barrier structure 330 may have the following approximate thicknesses. For example, the first MTO layer 332 may have a thickness equal to or greater than 0.9 nm and less than or equal to 2.7 nm, or a thickness of approximately 1.8 nm. In another example, the second MTO layer 338 may have a thickness equal to or greater than 0.9 nm and less than or equal to 2.7 nm, or a thickness of approximately 1.8 nm. The first MTO layer 332 and the second MTO layer 338 may have a similar thickness or the same thickness or may have a different thickness. For example, in another embodiment, the first MTO layer may have a thickness of approximately 1 nm, and the second MTO layer may have a thickness of approximately 1.5 nm or greater. In one embodiment, the ratio of the thicknesses of the second MTO layer over the first MTO layer may be 1 to 1.5. In another example, the middle thermal barrier layer 336 including, e.g., RuAl, may have a thickness equal to or greater than 0.5 nm and less than or equal to 2.5 nm, or a thickness of approximately 1.5 nm. In another example, the TiN layer 334 may have a thickness equal to or greater than 0.6 nm and less than or equal to 1.2 nm, or a thickness of approximately 1 nm. In one aspect, these various dimensions are to be viewed as approximations and alternate dimensions may be implemented in one or more embodiments described herein. In another aspect, these dimensions may be considered exact.

The improved seed-thermal barrier structure 330 including a TiN layer and middle thermal barrier layer between a first MTO layer and a second MTO layer addresses and/or solves the corrosion problem of seed-thermal barriers with an MgO layer. In addition, the proposed stack may be functionally equivalent to a single MTO layer in terms of its promotion of good $L1_0$-FePt ordering (e.g., facilitation of proper magnetic grain growth in the MRL structure 322) and optical coupling to the NFT 122.

Figure 4:
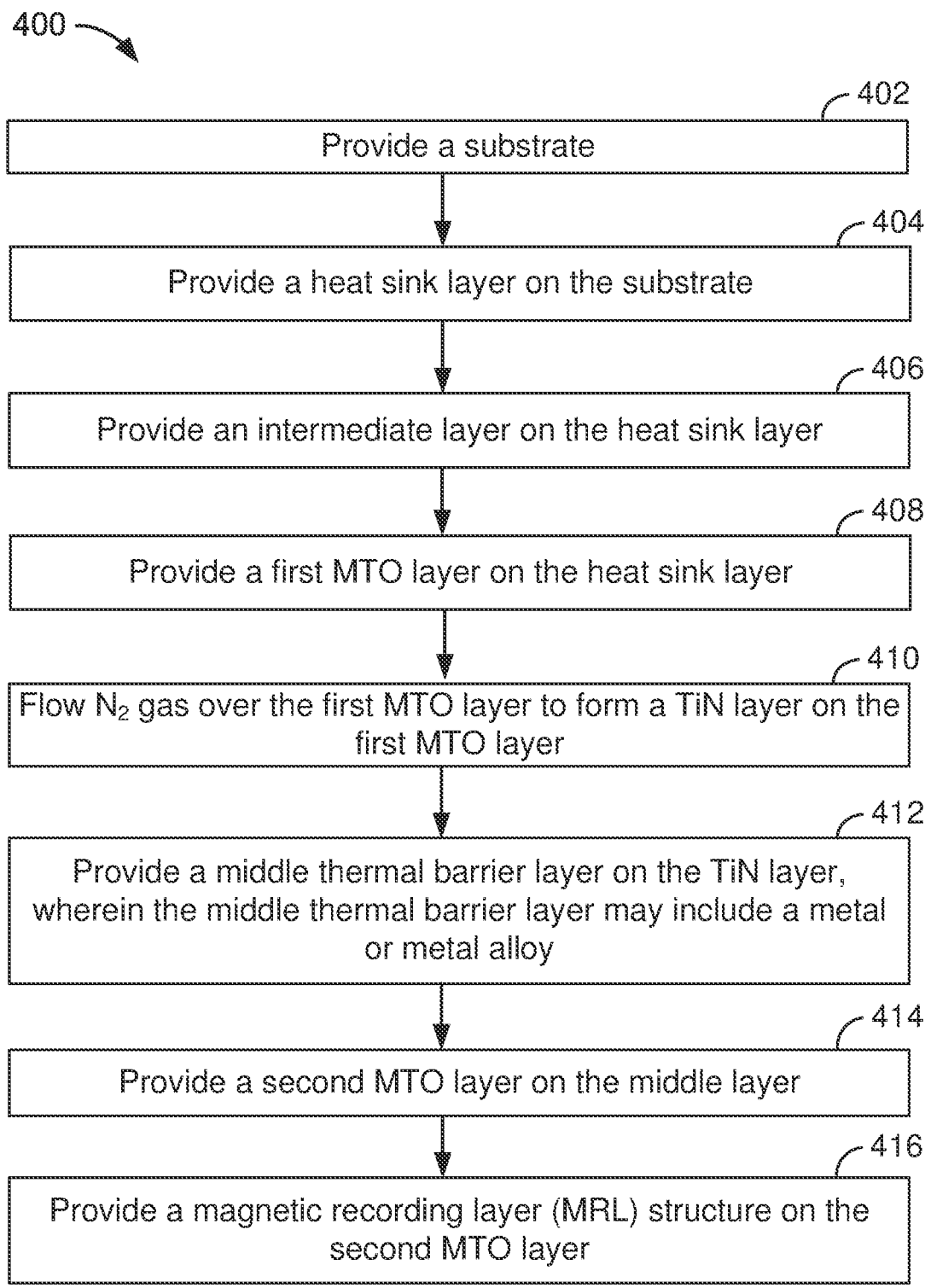
FIG. 4 is a flowchart of an exemplary process for fabricating a HAMR medium in accordance with some aspects of the disclosure.

FIG. 4 illustrates a flowchart of a process 400 for fabricating a HAMR medium in accordance with some aspects of the disclosure. In one aspect, the process 400 can be used or modified to fabricate the magnetic recording medium 300 described above in relation to FIG. 3. At 402, the process 400 provides a substrate (e.g., substrate 302). In one embodiment, at 402, the process 400 also deposits or otherwise provides one or more of an adhesion layer (e.g., adhesion layer 304), SUL (e.g., SUL 306), or seed layer (e.g., seed layer 308). At 404, the process 400 further deposits or otherwise provides a heat sink layer (e.g., heat sink layer 310) on the substrate and when present, on one or more of the adhesion layer, SUL, or seed layer. At 406, the process 1400 may deposit or otherwise provide an intermediate layer (such as intermediate layer 312) on the heatsink layer. The process 400 may include etching the intermediate layer to reduce its thickness and/or to produce a smoother surface to seed a first MTO layer.

At 408, the process 400 deposits or otherwise provides a first MTO layer (e.g., first MTO layer 332) on (or directly on) the heat sink layer, or when present, on (or directly on) the intermediate layer. In an embodiment, at 410, the process 400 causes a nitrogen N2 gas to flow into a deposition chamber (e.g., enclosing the substrate) and over the first MTO layer. For example, the process 400 may inject the N2 gas into the deposition chamber after the first MTO layer is deposited on the heat sink layer (or on the intermediate layer). The N2 gas reacts with the first MTO layer and forms a mixture of Ti and N in a TiN layer (such as TiN layer 334) that is on (or directly) on the first MTO layer. The TiN layer thus includes a mixture of Ti that migrated from the first MTO layer and injected, reactive N2 gas residue. In one aspect, the TiN layer 334 may prevent the further migration of Ti into the upper MTO layer and MRL structure. This Ti migration might otherwise cause problems in the MRL structure that would reduce recording performance.

At 412, the process 400 provides or deposits a middle thermal barrier layer on (or directly on) the TiN layer (such as middle thermal barrier layer 336), wherein the middle thermal barrier may include a metal or metal alloy or other suitable material. At 414, the process 400 provides or deposits a second MTO layer (e.g., second MTO layer 338) on (or directly on) the middle thermal barrier layer.

At 416, the process provides an MRL structure (e.g., deposits one or more magnetic recording layers) on (or directly on) the second MTO layer. In one aspect, the MRL structure is sputter deposited. A first layer of the MRL structure may be a FePt—Ag—MgO or FePt—Ag—SiO2 magnetic layer and may include an embedded reactive gas (e.g., N2) residue. For example, N2 gas may be injected into a chamber while a first layer of the MRL structure is deposited on the second MTO layer. For example, a FePt—Ag—MgO or FePt—Ag—SiO2 target can be reactively sputtered with a reactive gas (N2) or pure N2 gas to produce the magnetic recording layer containing FePt—Ag—MgO or FePt—Ag—SiO2. In one example, the DC sputtering process can be performed using a reactive gas e.g., N2 or N2 and Ar, at a temperature between about 550 degrees C. (° C.) and about 600° C. The reactive gas may be provided with a ratio of flow rates of N2 to (Ar+N2) between about 60 percent and about 100 percent, wherein the ratio of flow rates is the flow rate of N2 in standard cubic centimeters per minute (sccm) over the ratio of the flow rate of Ar in sccm plus the flow rate of N2 in sccm. The unit seem equals 1 cm$^3$/min at a standard temperature and pressure. This ratio of the flow rates provides an indication of the flow of the volume of N2 gas in relation to the total volumetric flow. This process is described in more detail in U.S. patent application Ser. No. 17/945,747, entitled "Media Structure Configured for Heat-Assisted Magnetic Recording and Improved Media Fabrication," filed on Sep. 15, 2022, and hereby incorporated by reference herein. In an embodiment, at 416, the process 400 may also provide one or more of a magnetic cap (e.g., magnetic cap 324) or an overcoat (e.g., overcoat 326) on the MRL structure.

In several aspects, the deposition of the layers can be performed using a variety of deposition sub-processes, including, but not limited to physical vapor deposition (PVD), sputter deposition and ion beam deposition, and chemical vapor deposition (CVD) including plasma-enhanced chemical vapor deposition (PECVD), low pressure chemical vapor deposition (LPCVD) and atomic layer chemical vapor deposition (ALCVD). In other aspects, other suitable deposition techniques known in the art may also be used. Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed.

In some aspects, with the middle thermal barrier layer 336 and TiN layer 334 positioned between the first MTO layer 332 and the second MTO layer 338, two additional high resistive interfaces are created. For example, when the middle thermal barrier layer 336 includes RuAl, the two additional high resistive interfaces include a first MTO/TiN/RuAl interface and a second MTO/RuAl interface. These metal oxide interfaces introduce additional thermal resistance $R_{TH}$ such that the seed-thermal barrier understructure 330 has a greater thermal resistance $R_{TH}$ than a single underlayer of MTO, as shown below.

In one aspect, the configuration or structure of the N2 gas formed TiN layer differs at least somewhat from the configuration or structure of a layer formed (of TiN) using a different deposition technique, such as RF/DC sputtering, CVD, or PVD, at least at a microscopic or sub-microscopic level.

Figure 5:
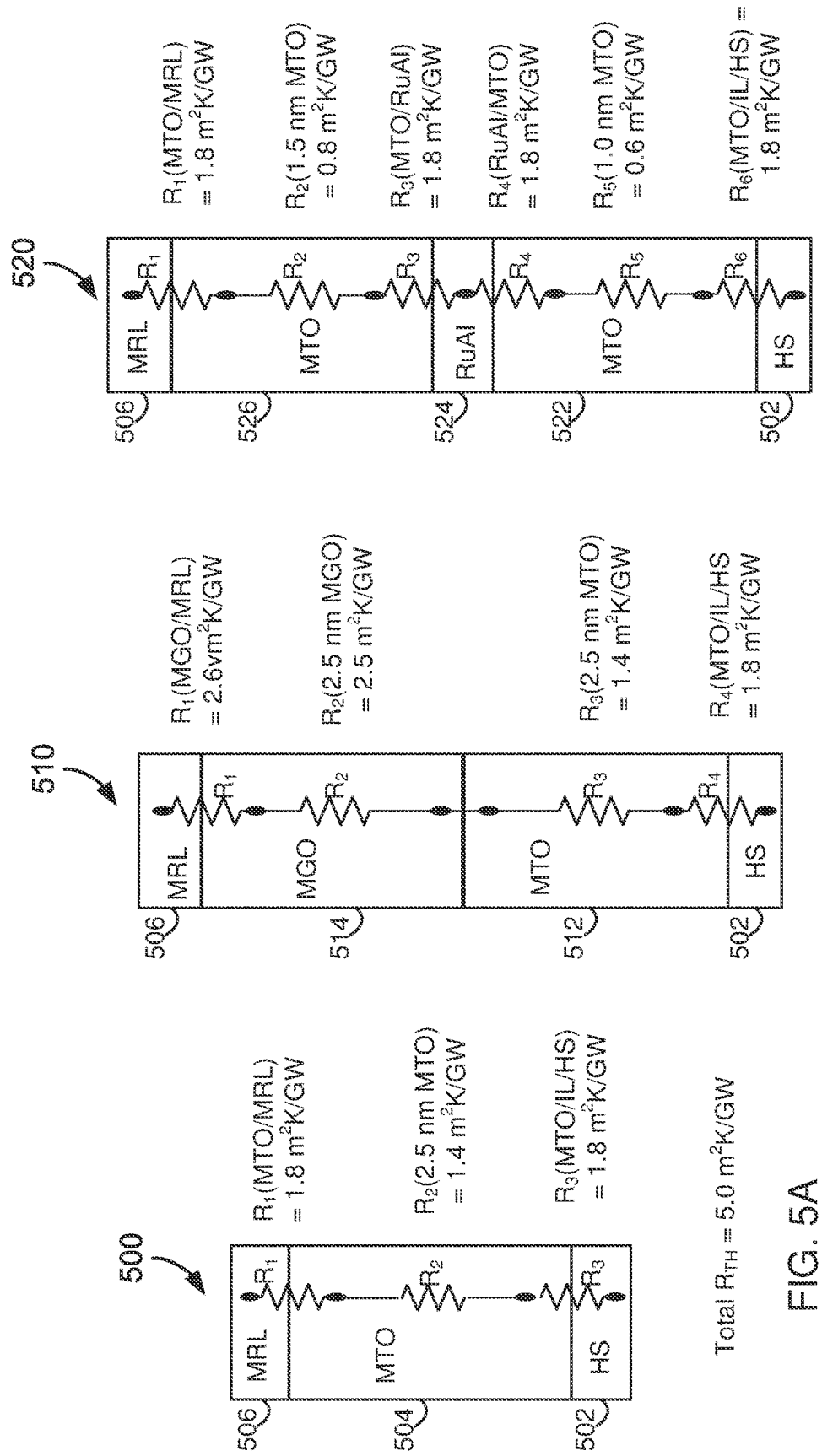
FIGS. 5A-C are schematic block diagrams illustrating the theoretical surface thermal resistance of various underlayer configurations for HAMR media in accordance with some aspects of the disclosure.

FIGS. 5A-C are schematic block diagrams illustrating the theoretical surface thermal resistance $R_{TH}$ of various underlayer configurations for HAMR media in accordance with some aspects of the disclosure. FIG. 5A illustrates an exemplary underlayer configuration for a HAMR medium 500 including a single MTO layer 504 between a heatsink layer (HS) 502 and a MRL structure 506. This exemplary HAMR medium 500 has a theoretical surface thermal resistance $R_1$ at the interface of the MTO layer 504 and the MRL structure 506 of 1.8 meters squared Kelvin per gigawatt ($m^2K/GW$), a theoretical surface thermal resistance $R_2$ of the MTO layer 504 of 1.4 $m^2K/GW$, and a theoretical surface thermal resistance $R_3$ at the interface of the MTO layer 504 and HS layer 502 of 1.8 $m^2K/GW$. If there is a thin intermediate layer (IL) between the MTO layer 504 and the HS layer, the thermal resistance $R_3$ includes the contributions of this intermediate layer and of its interfaces. So, this underlayer configuration of the HAMR medium 500 has a total surface thermal resistance $R_{TH}$ of approximately 5.0 $m^2K/GW$.

FIG. 5B illustrates another underlayer configuration for an exemplary HAMR medium 510 including an MTO/MgO bilayer between a heatsink layer (HS) 502 and a MRL structure 506. This exemplary HAMR medium 510 has a theoretical surface thermal resistance $R_1$ at the interface of the MgO layer 514 and MRL layer 506 of 2.6 $m^2K/GW$, a theoretical surface thermal resistance $R_2$ of the MgO layer 514 of 2.5 $m^2K/GW$, a theoretical surface thermal resistance $R_3$ of the MTO layer 512 of 1.4 $m^2K/GW$, and a theoretical surface thermal resistance $R_4$ at the interface of the MTO layer 512, the intermediate layer (IL), when present, and HS layer 502 of 1.8 $m^2K/GW$. In total, this underlayer configuration of the HAMR medium 510 has a surface thermal resistance $R_{TH}$ of approximately 6.05 $m^2K/GW$.

FIG. 5C illustrates another underlayer configuration for an exemplary HAMR medium 520 including a middle thermal barrier layer 524 of RuAl positioned between a first MTO layer 522 and a second MTO layer 526. In this exemplary HAMR medium 520, there is no TiN layer between the middle thermal barrier layer 524 and the MTO layer 522. The middle RuAl layer 524 creates a first MTO/RuAl interface and a RuAl/second MTO interface that introduce additional thermal resistance $R_{TH}$. For example, the theoretical surface thermal resistance $R_3$ at the interface of the second MTO layer 526 and the middle RuAl layer 524 is 1.8 $m^2K/GW$ and the theoretical surface thermal resistance $R_4$ of the interface of the middle RuAl layer 524 and the first MTO layer 522 is also 1.8 $m^2K/GW$. So, this portion of the HAMR medium 520 has a total surface thermal resistance $R_{TH}$ of at least approximately 8.6 $m^2K/GW$. The thermal resistance $R_{TH}$ at the metal oxide interfaces of MTO/RuAl and RuAl/MTO has a major contribution to the total thermal barrier resistance. By including the additional MTO/RuAl interfaces, the seed-thermal barrier structure 330 has a greater thermal resistance $R_{TH}$ than that of a single underlayer of MTO or the underlayer with the MTO/MgO bilayer.

Due to its increased surface thermal resistance, the seed-thermal barrier structure (e.g., see 330 in FIG. 3) enables the magnetic recording medium (e.g., see 300 in FIG. 3) to have high temperature gradients but at a lower required laser power. In theoretical modeling of HAMR media, the thermal resistance $R_{TH}$ of the thermal barrier is inversely related to the laser power $P_{laser}$ for a same temperature gradient dT/dx. By increasing the thermal resistance $R_{TH}$ of the seed-thermal barrier structure 330, the laser power necessary for writing to the magnetic recording medium 300 may be decreased.

Figure 6:
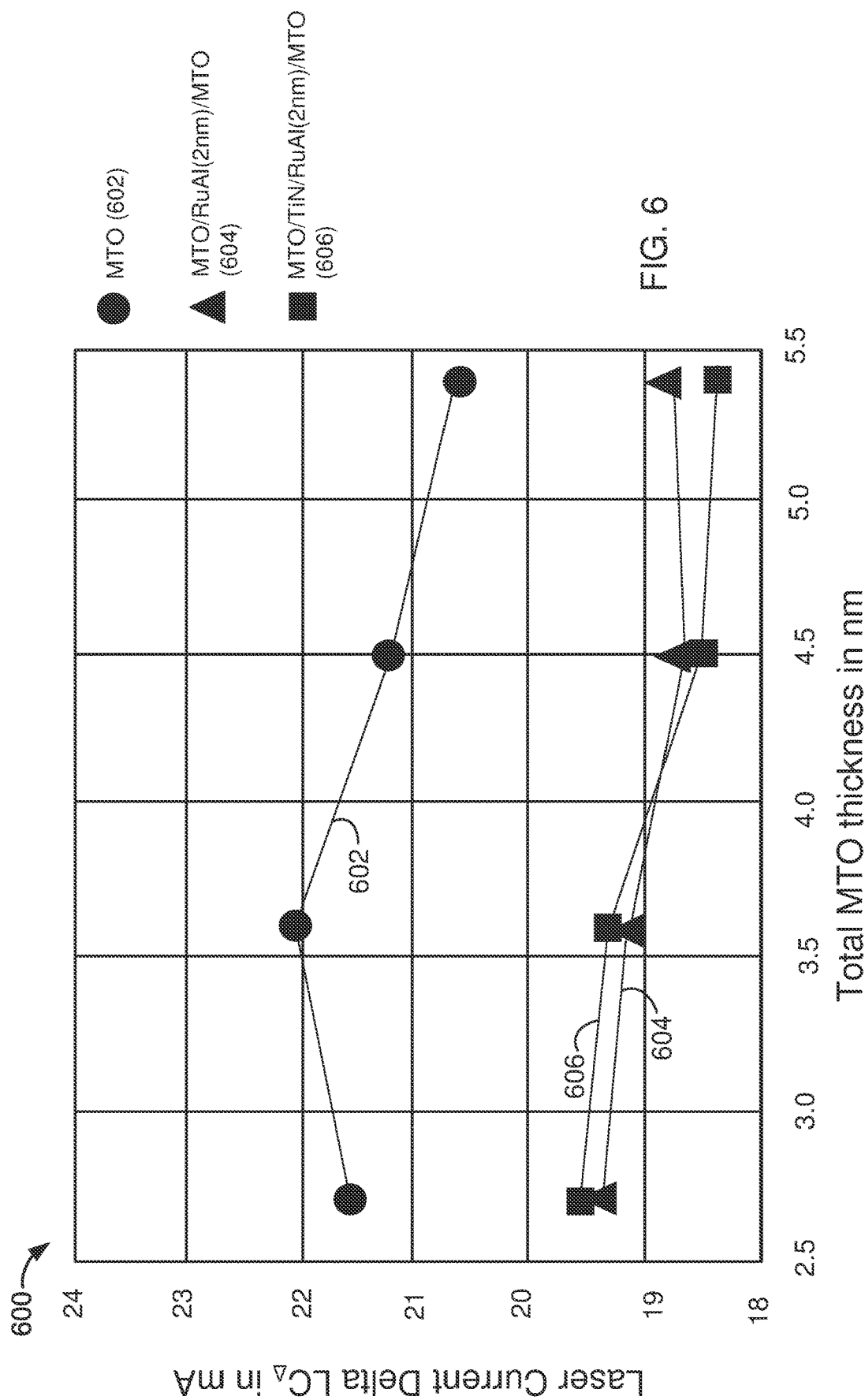
FIG. 6 is a graphical illustration of exemplary experimental results relating to levels of laser power $L_{pwr}$ needed at the slider to write to various HAMR media designs in accordance with some aspects of the disclosure.

FIG. 6 illustrates a graph 600 of exemplary experimental results of a laser current delta $LC_{pwr}$ for writing to various magnetic media. A first curve 602 illustrates the results for a first magnetic medium with a seed-thermal barrier layer including a single MTO layer. e.g., as shown in FIG. 5A. The second curve 604 illustrates the results for a second magnetic medium with a seed-thermal barrier structure including a middle thermal barrier layer of RuAl between a first MTO layer and a second MTO layer, without a TiN layer. e.g., as shown in FIG. 5C. The third curve 606 illustrates the results for a third magnetic medium with a seed—thermal barrier structure including a TiN layer and middle thermal barrier layer of RuAl between a first MTO layer and a second MTO layer, e.g., similar to the seed-thermal barrier structure 330 illustrated in FIG. 3.

The Y-axis of the graph 600 represents the amount of current in milliamps (mA) used to drive the laser diode above its threshold current (e.g., the laser current delta $LC_A$) to write data to the media, where the threshold current is the current at which the laser starts lasing. This laser current delta $LC_A$ measurement is proportional to the laser optical power $L_{pwr}$. The X-axis of the graph represents a total MTO thickness in nanometers (nm) for the different magnetic media. In this experiment, the thickness of the upper and lower MTO layers in the magnetic media of curves 604, 606 were equal and also were equally increased in increments for each test. For example, the 3.6 nm point on the X-axis indicates that the upper and lower MTO layers in curves 604, 606 have a total thickness of 3.6 nm and individually are both 1.8 nm, while the 4.5 nm point on the X-axis indicates that the upper and lower MTO layers in curves 604, 606 have a total thickness of 4.5 nm and individually are both 2.25 nm. In addition, in this experiment, the thickness of the middle thermal barrier layer of RuAl in both the magnetic media of curves 604, 606 was 2 nm and was not varied.

The graph 600 shows that the laser current delta $LC_A$ measurement, and so the required laser power $L_{pwr}$, decreased between curve 602 with a single MTO layer and the curves 604, 606 with the RuAl layer between first and second MTO layers in these experimental results. The middle RuAl layer between the first and second MTO layers increases the thermal resistance $R_{TH}$ of the seed-thermal barrier structure and so the laser power $L_{pwr}$ necessary for writing to the magnetic media decreases.

Figure 7:
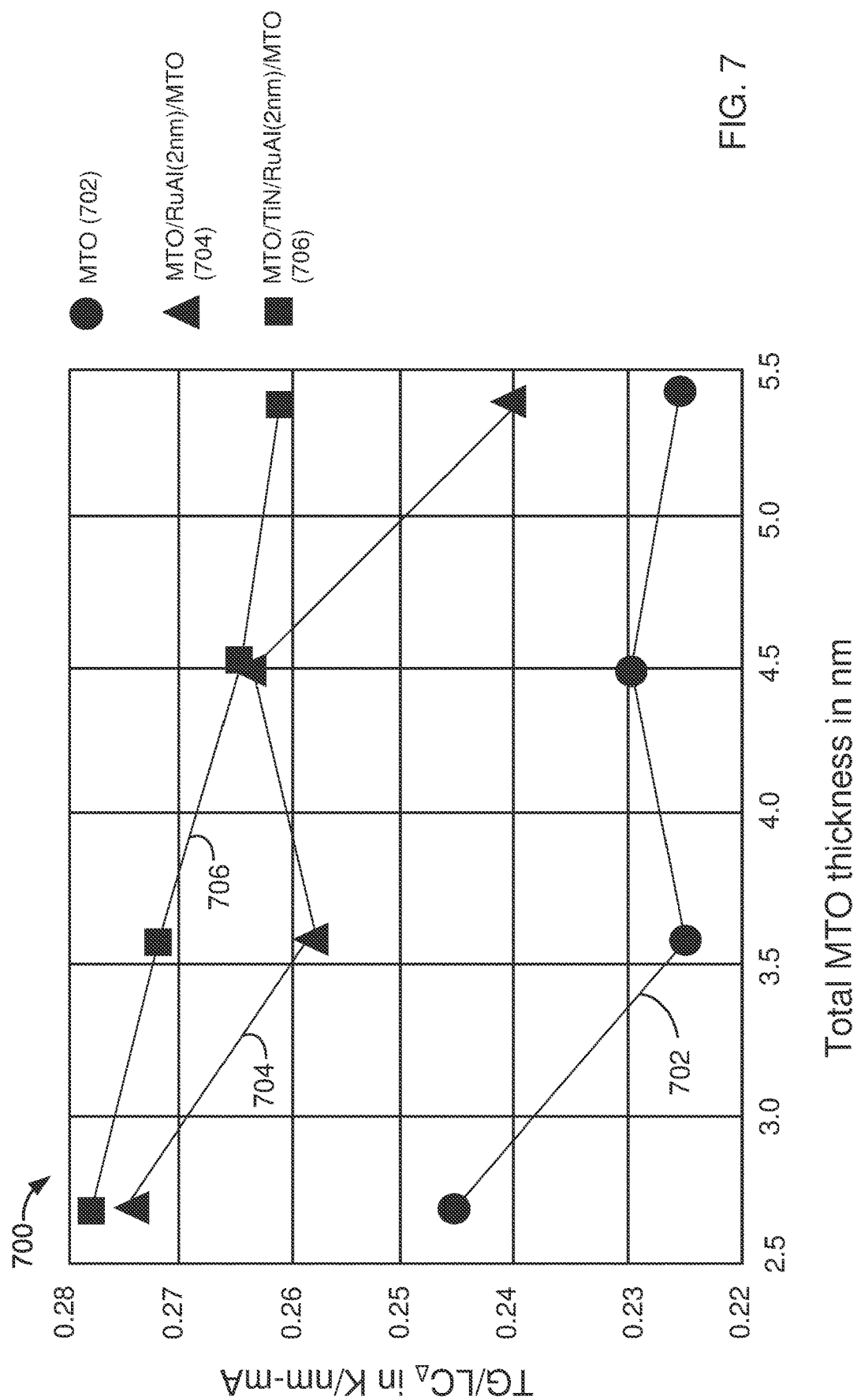
FIG. 7 is graphical illustration of exemplary experimental results relating to thermal gradients and laser power $L_{pwr}$ of various HAMR media designs in accordance with some aspects of the disclosure.

FIG. 7 illustrates a graph 700 of exemplary experimental results of the thermal gradient (TG) to laser current delta $LC_A$ of magnetic media with different underlayer configurations. The Y-axis of the graph 700 represents the measured thermal gradient TG in Kelvins per nanometer (K/nm) to $LC_A$ in mA during writing to the different magnetic media and the X-axis of the graph 700 represents a total MTO thickness in nanometers (nm) for the different magnetic media. Similar to the curves in FIG. 6, the first curve 702 illustrates the results for a first magnetic medium including a seed-thermal barrier layer with a single MTO layer, the second curve 704 illustrates the results for a second magnetic medium with a seed-thermal barrier structure including a middle thermal barrier layer of RuAl between a first MTO layer and second MTO layer, and the third curve 706 illustrates the results for a third magnetic medium with a seed-thermal barrier structure including a TiN layer and middle thermal barrier layer of RuAl between the first MTO layer and second MTO layer. In this experiment, the middle thermal barrier layer of RuAl in each of the magnetic media of curves 704, 706 has a thickness of 2 nm.

As seen in the graph 700, the magnetic media of curves 704, 706 had an increased TG/$LC_A$ ratio in comparison to the magnetic medium of curve 702. This result shows that the laser power $L_{pwr}$ decreased without a corresponding decrease of the thermal gradient TG in the curves 704, 706. The RuAl layer between the first and second MTO layers thus effectively decreases the laser power $L_{pwr}$ necessary for writing to the magnetic media without significantly affecting the thermal gradient TG of the magnetic media in these experimental results.

Figure 8:
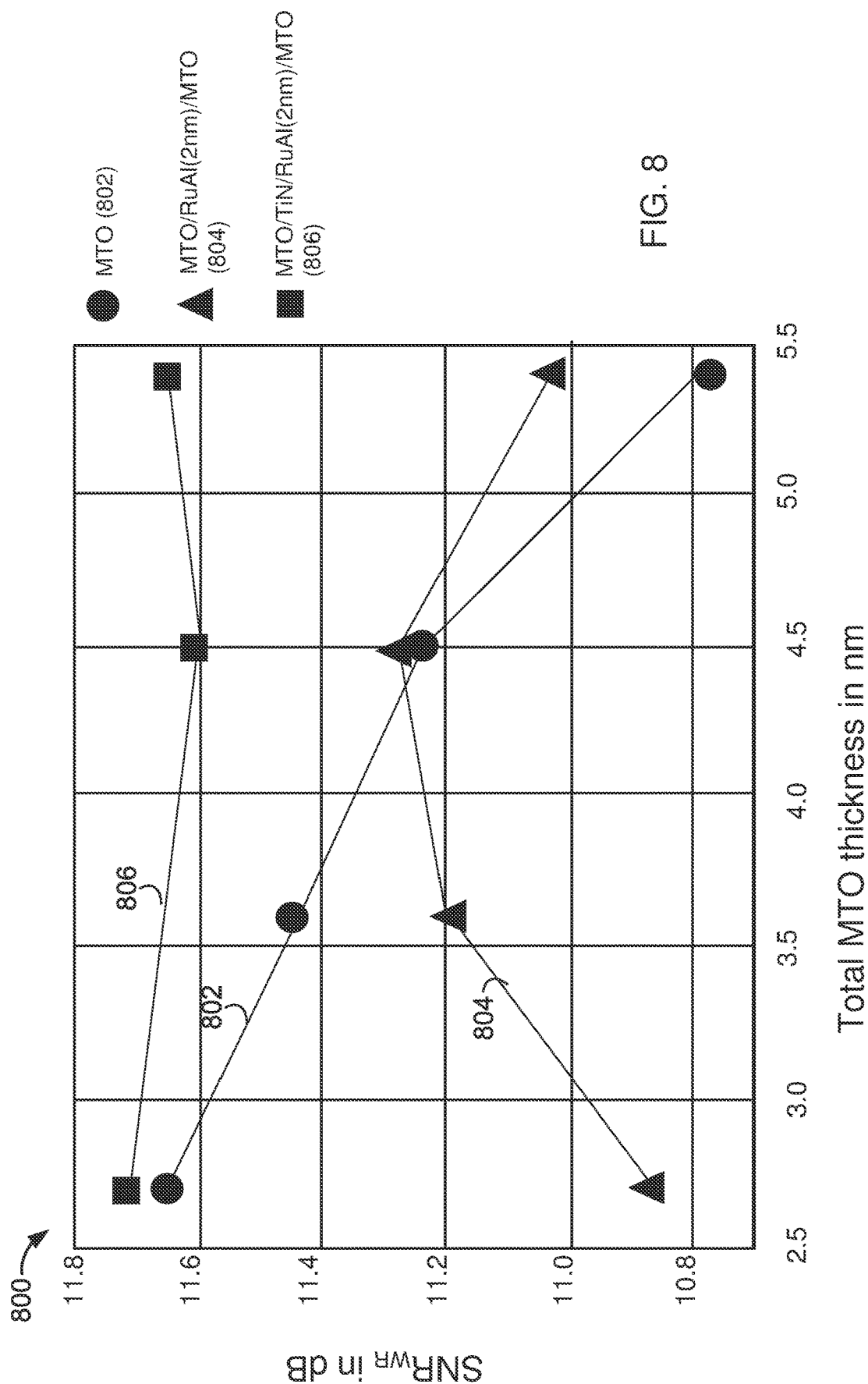
FIG. 8 is graphical illustration of exemplary experimental results relating to signal to noise ratio (SNR) of various HAMR media designs in accordance with some aspects of the disclosure.

FIG. 8 illustrates a graph 800 of exemplary experimental results of a signal to noise ratio (SNR) when writing to magnetic media with different underlayer configurations. The Y-axis of the graph 800 represents the measured SNR in decibels (dB) during writing ($SNR_{wr}$) and the X-axis of the graph represents a total MTO thickness in nanometers (nm) for the different magnetic media. Similar to FIGS. 6 and 7, the first curve 802 illustrates the results for a first magnetic medium including a seed-thermal barrier layer with a single MTO layer, the second curve 804 illustrates the results for a second magnetic medium with a seed-thermal barrier structure including a middle thermal barrier layer of RuAl between a first MTO layer and second MTO layer, and the third curve 806 illustrates the results for a third magnetic medium with a seed-thermal barrier structure including a TiN layer and middle thermal barrier layer of RuAl between the first MTO layer and second MTO layer. In this experiment, the middle thermal barrier layer of RuAl in each of the magnetic media of curves 804, 806 has a thickness of 2 nm.

Though the added middle thermal barrier layer of RuAl between the first MTO layer and second MTO layer decreased the laser power $L_{pwr}$ as shown in FIGS. 6 and 7, it was found that it had a negative effect on the $SNR_{wr}$ as shown in curve 804. For example, the $SNR_{wr}$ of curve 804 representing the second magnetic medium having a middle thermal barrier layer of RuAl between the first MTO layer and second MTO layer is less than the $SNR_{wr}$ of the first magnetic medium with a single MTO layer shown in curve 802, especially for cases with a thickness of MTO less than 4.5 nm.

However, in unexpected results, it was found that the TiN layer between the first MTO layer and middle RuAl layer, e.g., in the magnetic medium of curve 806, increases the $SNR_{wr}$ with respect to magnetic media of curve 804. As seen in graph 800, the $SNR_{wr}$ of the magnetic medium with the TiN and RuAl layers in curve 806 is greater than the $SNR_{wr}$ of the magnetic medium in curve 802 with a single MTO layer. The TiN layer, e.g., formed by exposing the first MTO layer with N2 gas, had the unexpected result of increasing the $SNR_{wr}$ of the magnetic medium from the $SNR_{wr}$ of the magnetic medium with a single MTO layer.

Figure 9:
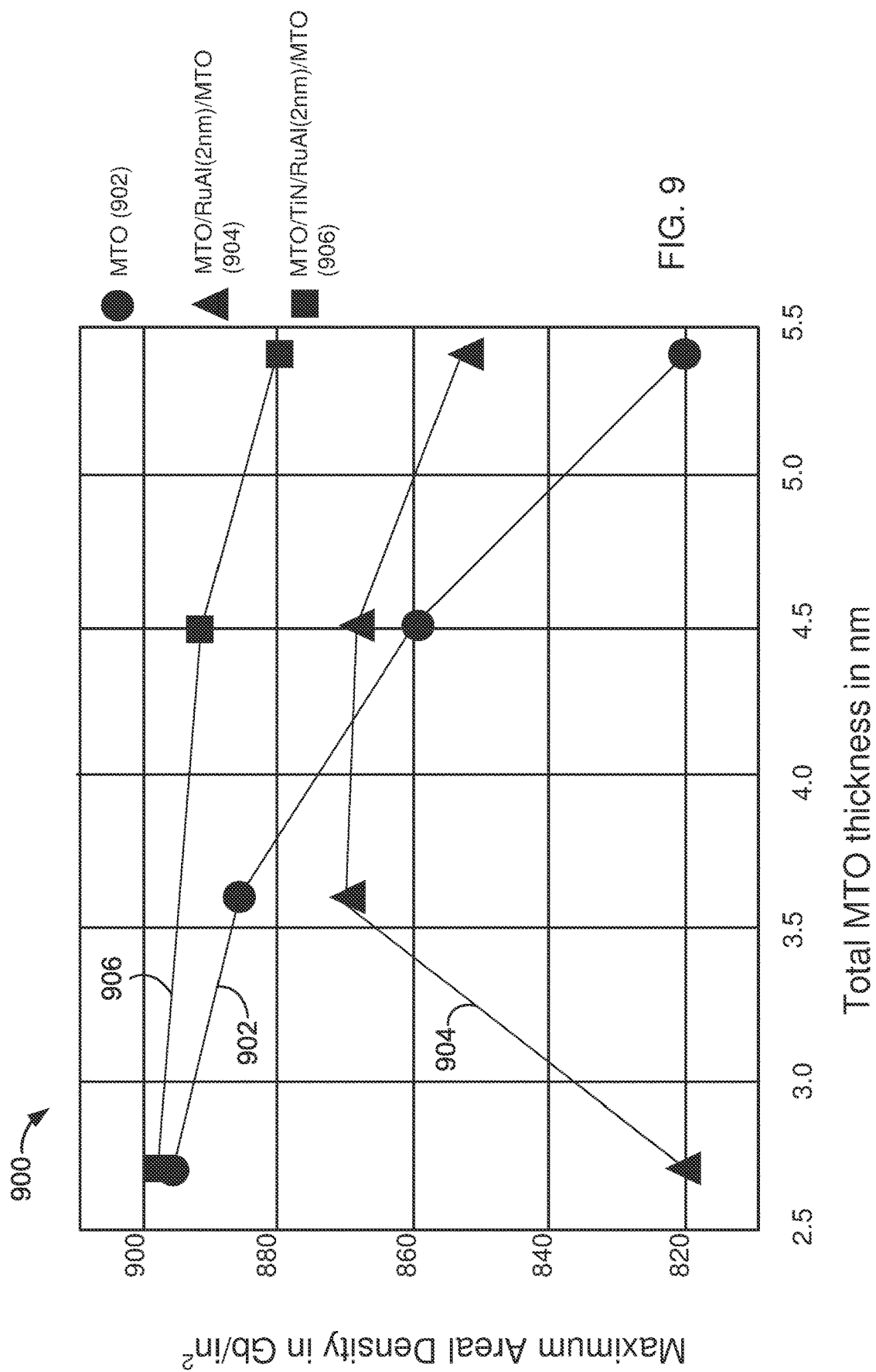
FIG. 9 is graphical illustration of exemplary experimental results relating to areal density metrics and underlayer thicknesses of various HAMR media designs in accordance with some aspects of the disclosure.

FIG. 9 illustrates a graph 900 of exemplary experimental results of a maximum areal density (MaxAD) metric when writing to different magnetic media. The Y-axis of the graph 900 represents the measured MaxAD in gigabits per inch squared ($Gb/in^2$) during writing and the X-axis of the graph represents a total MTO thickness in nm for the different magnetic media. Similar to the curves in FIGS. 6-8, the first curve 902 illustrates the results for a first magnetic medium with a seed-thermal barrier layer including a single MTO layer, the second curve 904 illustrates the results for a second magnetic medium with a seed-thermal barrier structure including a middle thermal barrier layer of RuAl between a first MTO layer and second MTO layer, and the third curve 906 illustrates the results for a third magnetic medium with a seed-thermal barrier structure including a TiN layer and middle thermal barrier layer of RuAl between the first MTO layer and second MTO layer. In this experiment, the middle thermal barrier layer of RuAl in each of the magnetic media of curves 904, 906 has a thickness of 2 nm.

Again, in unexpected results, it was found that the TiN layer between the first MTO layer and RuAl layer in the magnetic medium of curve 906 increases the MaxAD, e.g., with respect to magnetic medium of curve 904 without a TiN layer. In addition, the MaxAD of the magnetic medium with the TiN and RuAl layers in curve 906 has a greater MaxAD than the magnetic medium in curve 902 with a single MTO layer. Thus, the formation of the TiN layer, e.g., by exposing the first MTO layer with N2 gas, had unexpected results of increasing the MaxAD and the $SNR_{wr}$ of the magnetic medium to a level greater than the MaxAD and the $SNR_{wr}$ of the magnetic medium with a single MTO layer. This increase in MaxAD may be responsive to the increase in $SNR_{wr}$ as shown in Graph 800 of FIG. 8.

Figure 10:
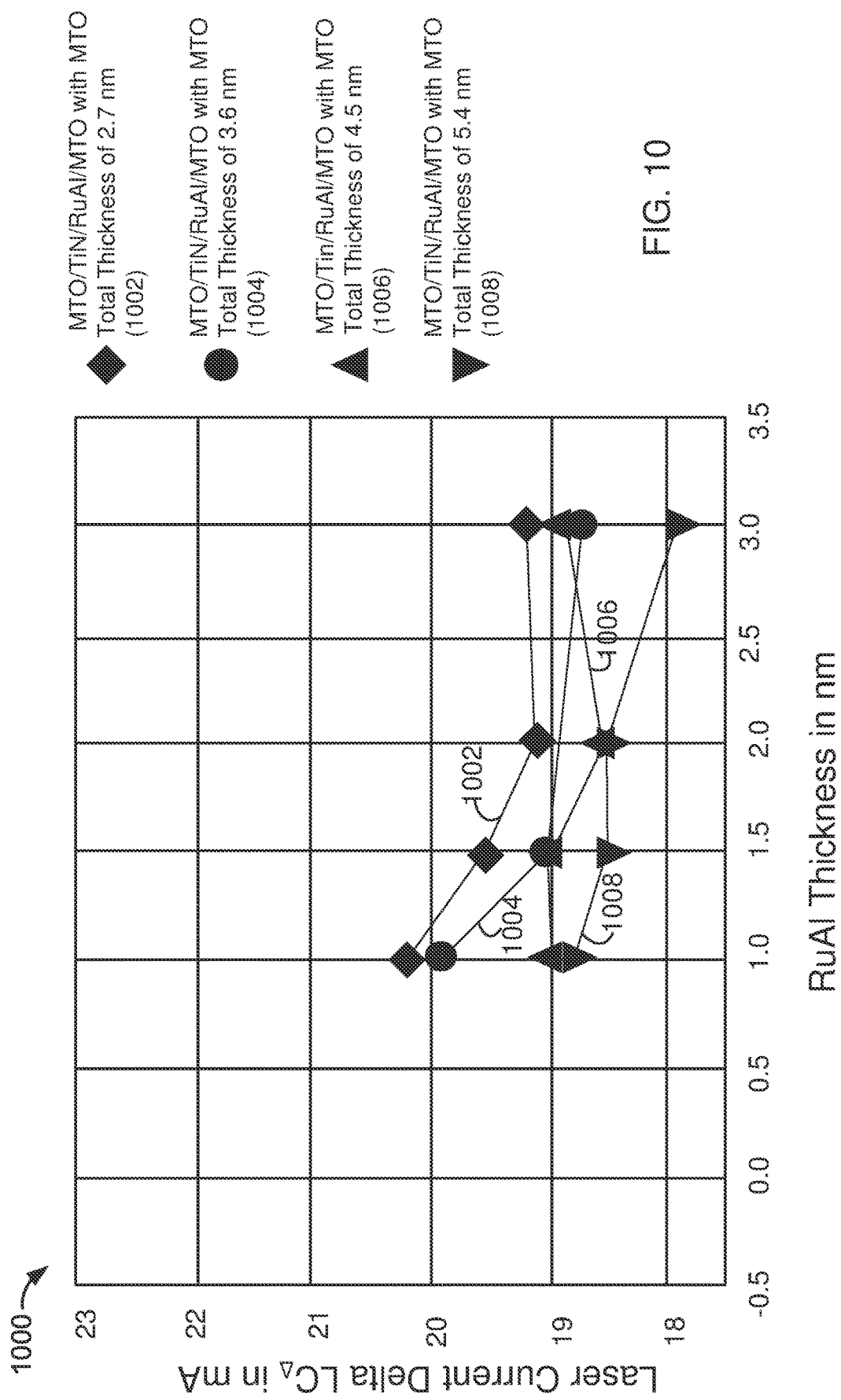
FIG. 10 is graphical illustration of exemplary experimental results relating to laser power $L_{pwr}$ and the thickness of the middle thermal barrier layer of various HAMR media designs in accordance with some aspects of the disclosure.

FIG. 10 illustrates a graph 1000 of exemplary experimental results of a laser current delta $LC_A$ for writing data to magnetic media with different thicknesses of an RuAl layer and MTO layers. The Y-axis of the graph 1000 represents the amount of current in milliamps (mA) used to drive the laser diode above its threshold current (e.g., the laser current delta $LC_A$) to write data to the media, where the threshold current is the laser diode current at which the laser starts lasing. This laser current delta $LC_A$ measurement is proportional to the laser optical power $L_{pwr}$. In this experiment, the magnetic media corresponding to curves 1002, 1004, 1006, and 1008 each have a seed-thermal barrier structure that includes a TiN layer and RuAl layer between a first MTO layer and a second MTO layer, as shown in FIG. 3. The X-axis represents a thickness of the RuAl layer in nm and the Y-axis represents the laser current delta $LC_A$ in mA. In this example, the magnetic media include first and second MTO layers each having a thickness of 1.35 nm in curve 1002, a thickness of 1.8 nm in curve 1004, a thickness of 2.25 in curve 1006, and a thickness of 2.7 nm in curve 1008.

As shown in graph 1000, the laser current delta $LC_A$, and so the required laser power $L_{pwr}$, decreases as the thickness of the RuAl layer increases for the different magnetic media in these experimental results. Similarly, the laser current delta $LC_A$, and so the required laser power $L_{pwr}$, decreases as the thicknesses of the first and second MTO layers increase in these experimental results.

Figure 11:
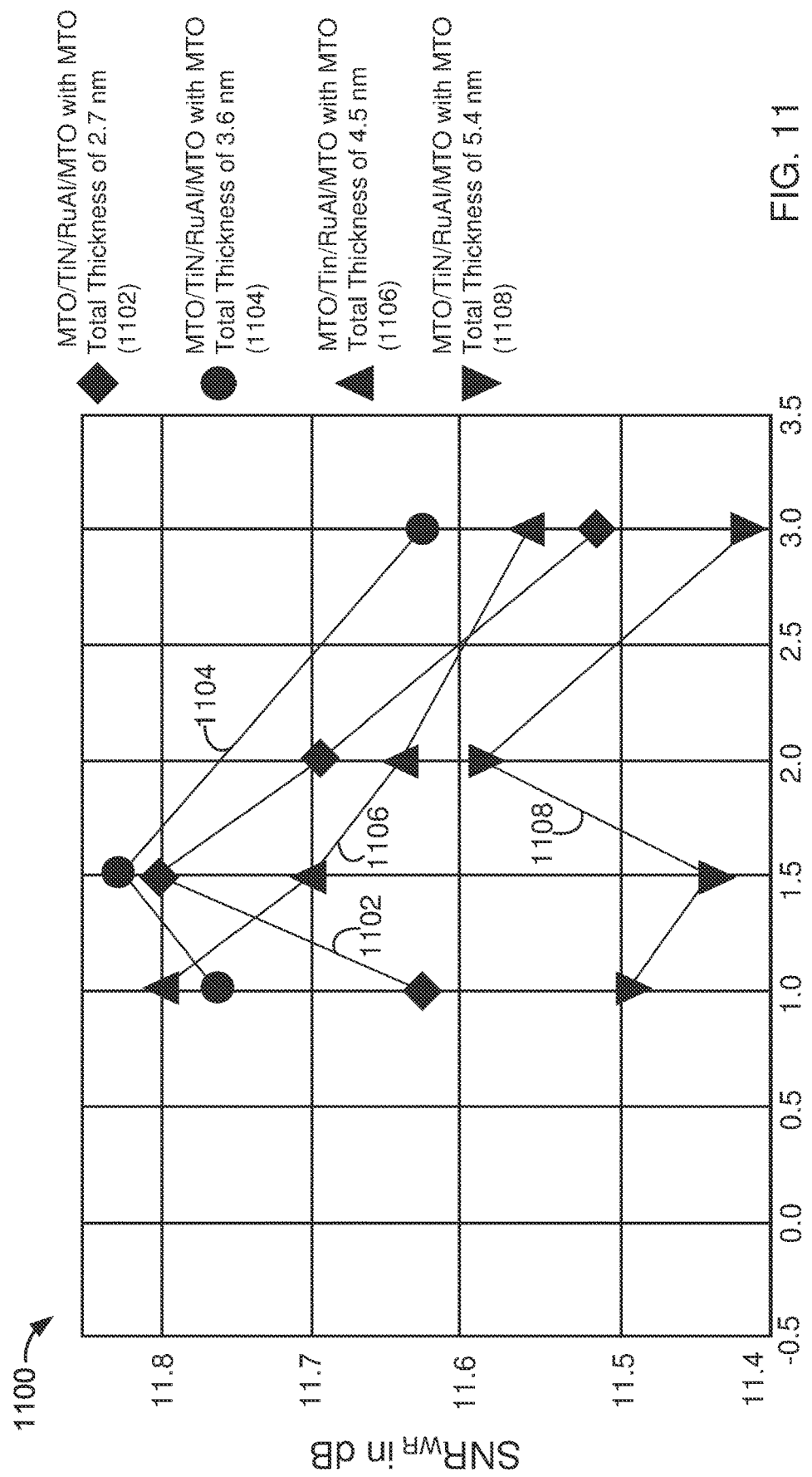
FIG. 11 is graphical illustration of exemplary experimental results relating to SNR and the thickness of the middle thermal barrier layer of various HAMR media designs in accordance with some aspects of the disclosure.

FIG. 11 illustrates a graph 1100 of exemplary experimental results of a signal to noise ratio (SNR) in dB when writing to different magnetic media. Similar to FIG. 10, in this experiment, the magnetic media in curves 1102, 1104, 1106, and 1108 each have a seed-thermal barrier structure that includes a TiN layer and RuAl layer between a first MTO layer and a second MTO layer, as shown in FIG. 3. The magnetic media have first and second MTO layers with each having a thickness of 1.35 nm in curve 1102, a thickness of 1.8 nm in curve 1104, a thickness of 2.25 in curve 1106, and a thickness of 2.25 nm in curve 1108. The X-axis represents a thickness of the RuAl layer in nm and the Y-axis represents the measured SNR when writing ($SNR_{wr}$) to the magnetic media.

In unexpected results, the curve 1104, representing a magnetic medium with first and second MTO layers having a thickness of 1.8 nm, has the highest SNR in these experimental results when the RuAl layer has a thickness of approximately 1.5 nm. This curve 1104 represents the magnetic medium with the first and second MTO layers each having a thickness of 1.8 nm or a total thickness of 3.6 nm. As such, to obtain a good laser power $L_{pwr}$ and high $SNR_{wr}$, in one embodiment, the first MTO layer and the second MTO layer may each have a thickness equal to or greater than 0.9 nm and less than or equal to 2.7 nm, or a thickness of approximately 1.8 nm, and the middle (RuAl) layer 336 has a thickness equal to or greater than 0.5 nm and less than or equal to 2.5 nm, or a thickness of approximately 1.5 nm.

This magnetic medium with a seed-thermal barrier structure that includes a TiN layer and RuAl layer between first and second MTO layers has significant advantages. It addresses and/or solves the corrosion problem of seed-thermal barriers with an MgO layer while still promoting good $L1_0$-FePt ordering (e.g., facilitation of proper magnetic grain growth in the MRL) and optical coupling to the NFT. The magnetic medium also has decreased laser power $L_{pwr}$ required when writing due to the increased thermal resistance $R_{TH}$. Moreover, in unexpected results, it was found that the TiN layer formed on the first MTO layer increases the SNR (e.g., $SNR_{wr}$) and increases the areal density (e.g., areal density metric MaxAD) of the magnetic medium. Without the TiN layer, e.g., including only the MTO-RuAl-MTO layers in the seed thermal barrier structure, the $SNR_{wr}$ and MaxAD of the magnetic medium were measured as less than that of a magnetic medium with a single MTO layer. It is theorized that the TiN layer may prevent the diffusion or migration of Ti from the first MTO layer into the second MTO layer and into the MRL structure where it may interfere with the recording grains and decrease the overall media recording performance. The TiN layer thus provides unexpected results of improving the performance of the magnetic medium by preventing the migration of Ti into the MRL structure.

ADDITIONAL EXAMPLES AND EMBODIMENTS

FIG. 12 is a side schematic view of a HAMR medium 1200 with another embodiment of a seed-thermal barrier structure 1210 in accordance with one aspect of the disclosure. In this embodiment, the seed-thermal barrier structure 1210 includes a first MTO layer 1212 on the intermediate layer 312, first TiN layer 1214 on the first MTO layer 1212, first middle thermal barrier layer 1216 on the first TiN layer 1214, and a second MTO layer 1218 on the first middle thermal barrier layer 1216. In addition, the seed-thermal barrier structure 1210 further includes a second TiN layer 1220 on the second MTO layer 1218, a second middle thermal barrier layer 1222 on the second TiN layer 1220, and a third MTO layer 1224 on the second middle thermal barrier layer 1222. The MRL structure 322 is positioned on the third MTO layer 1224.

The first middle thermal barrier layer 1216 includes one or more metals or other materials that form a high thermal resistance interface with the first MTO layer 1212 and/or the second MTO layer 1218 and provides a good seed layer for the second MTO layer 1218. The second middle thermal barrier layer 1222 includes one or more metals or other materials that form a high thermal resistance interface with the second MTO layer 1220 and/or the third MTO layer 1224 and provides a good seed layer for the third MTO layer 1224. In some embodiments, the first middle thermal barrier layer 1216 and/or the second middle thermal barrier layer 1222 may include an alloy of Ru and Al (RuAl). In other embodiments, the first middle thermal barrier layer 1216 and/or the second middle thermal barrier layer 1222 may include Pt or an alloy including Pt. In other embodiments, the first middle thermal barrier layer 1216 and/or the second middle thermal barrier layer 1222 may include an alloy of Pt and one or more of: Zr, Ta, and/or another metal or suitable material. In another embodiment, the first middle thermal barrier layer 1216 and/or the second middle thermal barrier layer 1222 may include Rh and/or Cr and/or a mixture or alloy of Fe and Pt (FePt). In another embodiment, the first middle thermal barrier layer 1216 and/or the second middle thermal barrier layer 1222 may include a mixture or alloy of Cr and Mo (CrMo). In another embodiment, the first middle thermal barrier layer 1216 and/or the second middle thermal barrier layer 1222 may include one or more of these metals and/or another metal or metal alloy or other suitable material(s).

In one aspect, the first MTO layer 1212, the second MTO layer 1218, and the third MTO layer 1224 each include a mixture of MgO and $TiO_2$ (MTO). In one example, the percentage $P_{TiO}$ of TiO in the MTO mixtures is in a range of 30 mole percent (mol %) to 90 mol % or in another example, the percentage $P_{TiO}$ of TiO in the MTO mixtures is 50 mol %. Although the first MTO layer 1212, the second MTO layer 1218, and the third MTO layer 1224 may be formed of the same materials, the three MTO layers do not need to include the same materials and, in some examples, the three MTO layers may be formed of different materials or may have different percentages $P_{TiO}$ of TiO in their MTO mixtures.

Figure 13:
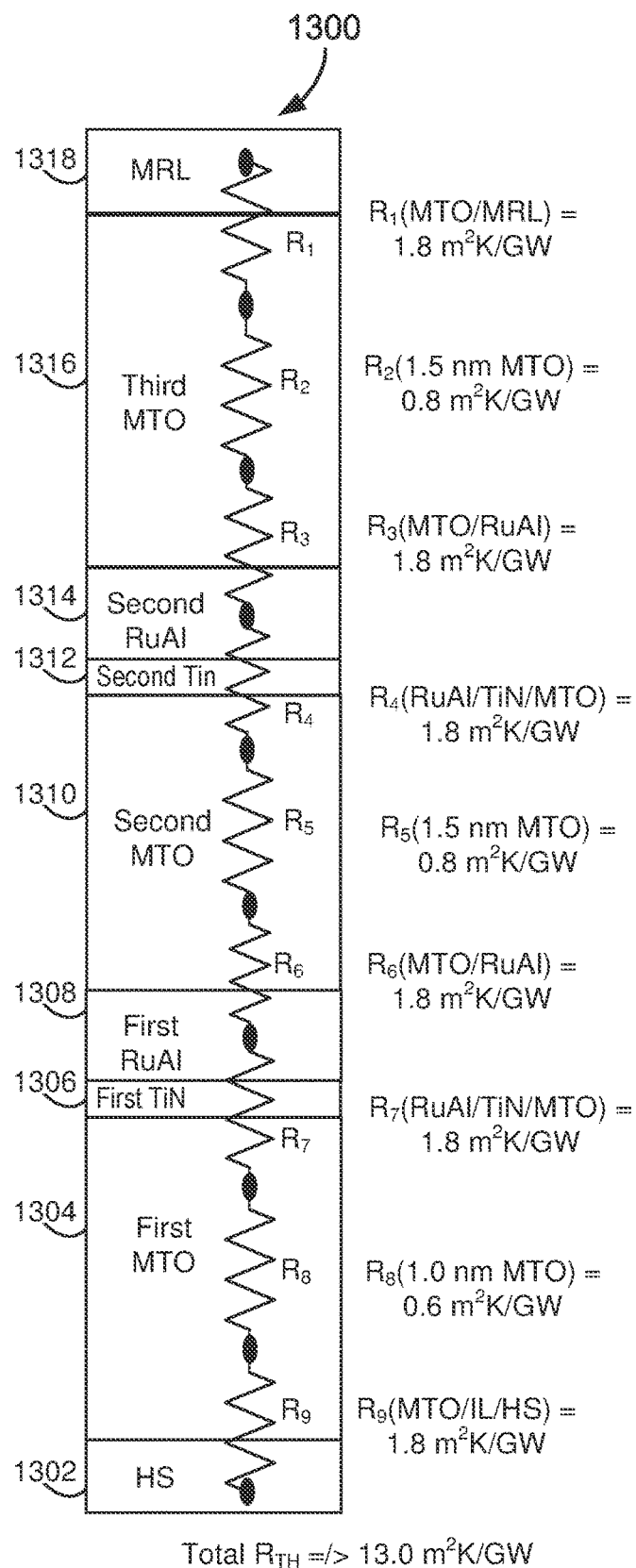
FIG. 13 is a schematic block diagram illustrating the theoretical surface thermal resistance of another underlayer configuration for a HAMR medium in accordance with some aspects of the disclosure.

FIG. 13 is a schematic block diagram illustrating theoretical surface thermal resistance $R_{TH}$ of another HAMR medium 1300. Similar to the HAMR medium 1200 in FIG. 12, this HAMR medium 1300 includes a first MTO layer 1304 on an intermediate layer (IL) and/or on a heat sink layer (HS) 1302, first TiN layer 1306 on the first MTO layer 1304, first middle thermal barrier layer 1308 including RuAl on the first TiN layer 1306, and a second MTO layer 1310 on the first middle RuAl layer 1308. In addition, the HAMR medium 1300 includes a second TiN layer 1312 on the second MTO layer 1310, a second middle thermal barrier layer 1314 including RuAl on the second TiN layer 1312, and a third MTO layer 1316 on the second middle RuAl layer 1314. The MRL structure 1318 is positioned on the third MTO layer 1316.

By including the second TiN layer 1312, middle RuAl layer 1314 and third MTO layer 1316, two additional highly resistive MTO interfaces ($R_3$ and $R_4$) are formed in the seed-thermal barrier structure. These additional MTO/metallic interfaces ($R_3$ and $R_4$) further increase the thermal resistance $R_{TH}$, e.g., in comparison to the seed-thermal barrier structure 520 shown in FIG. 5C. For example, the theoretical total thermal resistance $R_{TH}$ in this seed-thermal barrier structure 1300 is equal to approximately 13.0 $m^2K/GW$ while the theoretical total thermal resistance $R_{TH}$ in the seed-thermal barrier structure 520 shown in FIG. 5C is equal to approximately 8.6 $m^2K/GW$. This increased thermal resistance $R_{TH}$ may further decrease the required laser power $L_{pwr}$ when writing to the HAMR medium. Additional MTO/ metallic interfaces layers may further be added to the seed-thermal barrier structure 1300 in other embodiments.

Figure 14:
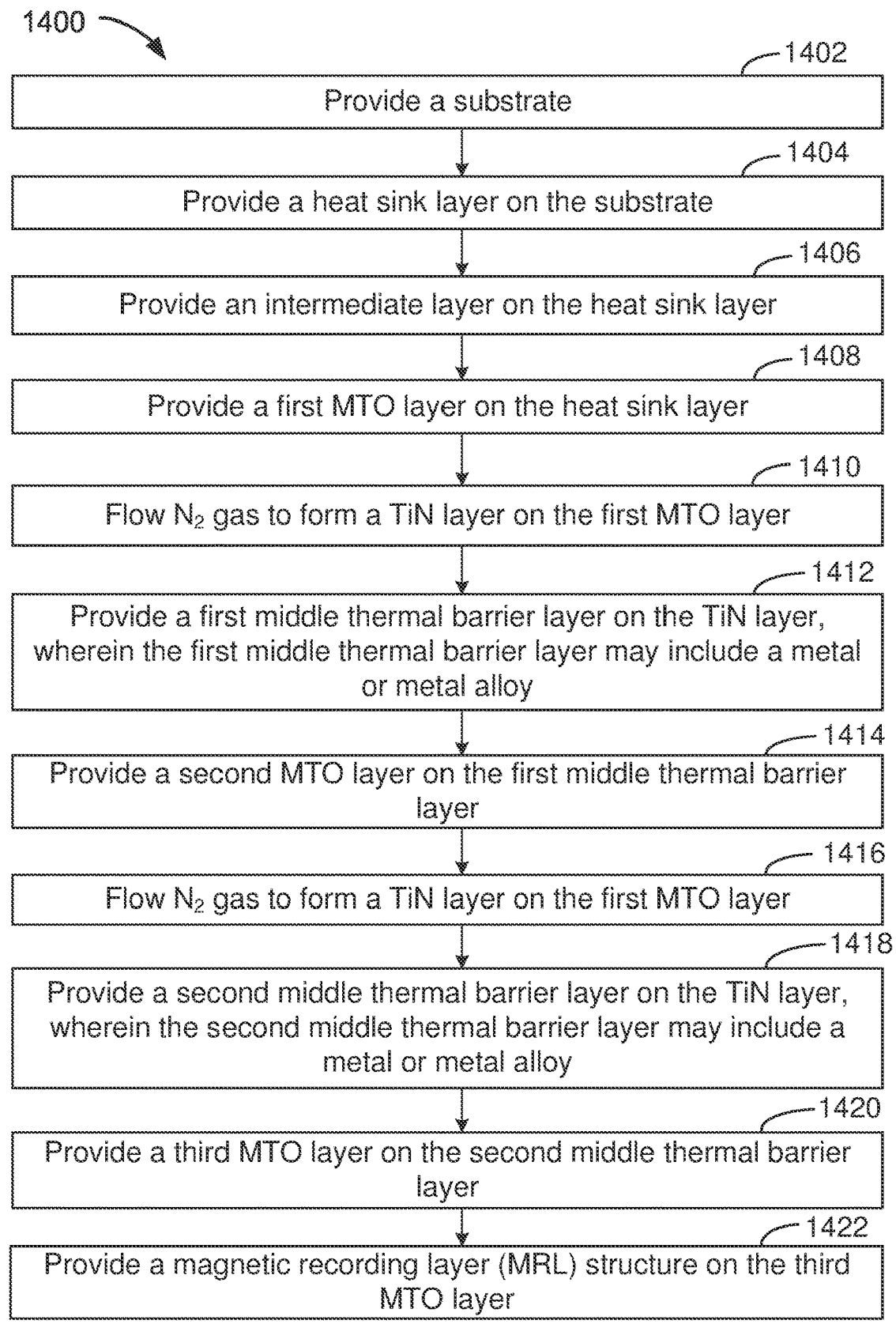
FIG. 14 is a flowchart of another exemplary process for fabricating a HAMR medium in accordance with some aspects of the disclosure.

FIG. 14 illustrates a flowchart of a process 1400 for fabricating another embodiment of a HAMR medium in accordance with some aspects of the disclosure. In one aspect, the process 1400 can be used or modified to fabricate the magnetic recording medium 1200 described above in relation to FIG. 12. At 1402, the process 1400 provides a substrate (e.g., substrate 302). In an embodiment, at 1402, the process 1400 may further provide one or more of an adhesion layer (e.g., adhesion layer 304), SUL (e.g., SUL 306), or seed layer (e.g., seed layer 308). At 1404, the process 1400 further provides a heat sink layer (e.g., deposits a heat sink layer 310) on the substrate and when present, on one or more of the adhesion layer, SUL, or seed layer. At 1406, the process 1400 may provide an intermediate layer (such as intermediate layer 312) on the heatsink layer. The intermediate layer may be made of RuAl, RuAlTiO2, and/or other suitable materials known in the art. The process 1400 may include etching the intermediate layer to reduce its thickness and/or to produce a smoother surface on the heat sink layer to seed a first MTO layer. In some examples, this intermediate layer is optional and may not be present.

At 1408, the process 1400 provides the first MTO layer (e.g., first MTO layer 1214) on or directly on the intermediate layer, when present or on or directly on the heat sink layer when the intermediate layer is not present. In an embodiment, at 1410, the process 1400 causes a nitrogen N2 gas to flow into a deposition chamber (e.g., enclosing the substrate) over the first MTO layer. For example, N2 gas may be injected into the deposition chamber after the first MTO layer is deposited on the intermediate layer, or deposited on the heat sink layer when the intermediate layer is not present. The N2 gas reacts with the first MTO layer and forms a mixture of Ti and N in a first TiN layer (such as first TiN layer 1214) on or directly on the first MTO layer. The TiN layer thus includes a mixture of Ti that migrated from the first MTO layer and the injected, reactive N2 gas residue. The first TiN layer may prevent the migration of Ti into the upper MTO layers and MRL structure.

At 1412, a first middle thermal barrier layer (e.g., first middle thermal barrier layer 1216) is provided on or directly on the first TiN layer, wherein the first middle thermal barrier may include a metal or metal alloy or other suitable material. At 1414, the process 1400 provides a second MTO layer (e.g., second MTO layer 1218) on or directly on the first middle thermal barrier layer.

At 1416, the process 1400 causes a nitrogen N2 gas to flow into a deposition chamber (e.g., enclosing the substrate) over the second MTO layer. For example, N2 gas may be injected into the deposition chamber after the second MTO layer is deposited on the first middle thermal barrier layer. The N2 gas reacts with the second MTO layer and forms a mixture of Ti and N in a second TiN layer (e.g., second TiN layer 1220) on or directly on the second MTO layer. The second TiN layer thus includes a mixture of Ti that migrated from the second MTO layer and injected, reactive N2 gas residue. The second TiN layer may prevent the migration of Ti into the upper MTO layer and MRL structure.

At 1418, a second middle thermal barrier layer (e.g., second middle thermal barrier layer 1222) is provided on or directly on the second TiN layer, wherein the second middle thermal barrier layer may include a metal or metal alloy or other suitable material. In some embodiments, this second middle thermal barrier layer may include a same or different material than the first middle thermal barrier layer. At 1420, the process 1400 provides a third MTO layer (e.g., third MTO layer 1224) on or directly on the second middle thermal barrier layer.

The first, second and third MTO layers may have a same thickness or a different thickness. In one embodiment, the first, second and third MTO layer each have a thickness equal to or greater than 0.9 nm and less than or equal to 2.7 nm, or a thickness of approximately 1.8 nm. In other embodiments, the first, second and third MTO layers have a total thickness of 3.6 nm, wherein the first MTO layer has a thickness of at least 1 nm, and the second and third MTO layers have a thickness of 1.3 nm. In another embodiment, the first and second middle thermal barrier layers each have a thickness equal to or greater than 0.5 nm and less than or equal to 2.5 nm, or a thickness of approximately 1.5 nm. In another embodiment, the first and second middle thermal barrier layers have a total thickness of approximately 1.5 nm, with the first and second middle thermal barrier layers each having a thickness of 0.75 nm. In another example, the first TiN layer and the second TiN layer may have a thickness equal to or greater than 0.6 nm and less than or equal to 1.2 nm, or a thickness of approximately 1 nm. In one aspect, these various dimensions are to be viewed as approximations and alternate dimensions may be implemented in one or more embodiments described herein. In another aspect, these dimensions may be considered exact.

At 1422, the process 1400 provides an MRL structure (e.g., deposits one or more magnetic recording layers) on or directly on the third MTO layer. A first layer of the MRL structure may be a FePt—Ag—MgO or FePt—Ag—SiO2 magnetic layer and may include an embedded reactive gas (e.g., N2) residue. For example, N2 gas may be injected into a chamber while a first layer of the MRL structure is provided on the second MTO layer. For example, a FePt—Ag—MgO or FePt—Ag—SiO2 target can be reactively sputtered with a reactive gas (N2) or pure N2 gas to produce the magnetic recording layer containing FePt—Ag—MgO or FePt—Ag—SiO2. In one example, the DC sputtering process can be performed using a reactive gas (e.g., N2 or (N2 and Ar)) at a temperature between about 550 degrees C. (° C.) and about 600° C. The reactive gas may have a ratio of flow rates of N2 to Ar+N2 between about 60 percent and about 100 percent. This process is described in more detail in U.S. patent application Ser. No. 17/945,747, entitled "Media Structure Configured for Heat-Assisted Magnetic Recording and Improved Media Fabrication," filed on Sep. 15, 2022, and hereby incorporated by reference herein. In an embodiment, at 1422, the process 1400 may also provide one or more of a magnetic cap (e.g., magnetic cap 324) or an overcoat (e.g., overcoat 326) on the MRL structure.

In several aspects, the deposition of the layers can be performed using a variety of deposition sub-processes, including, but not limited to physical vapor deposition (PVD), sputter deposition and ion beam deposition, and chemical vapor deposition (CVD) including plasma-enhanced chemical vapor deposition (PECVD), low pressure chemical vapor deposition (LPCVD) and atomic layer chemical vapor deposition (ALCVD). In other aspects, other suitable deposition techniques known in the art may also be used. Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structures, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

In one aspect, the processes described herein can perform the sequence of actions in a different order. In another aspect, the processes can skip one or more of the actions. In other aspects, one or more of the actions are performed simultaneously. In some aspects, additional actions can be performed.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain methods, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In one aspect, "about" as used herein may instead mean 5 percent. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium, comprising:
   a substrate;
   a heat sink layer on the substrate;
   an underlayer structure on the heat sink layer, wherein the underlayer structure includes a first layer comprising MgOTiO (MTO) on the heat sink layer, a second layer comprising TiN on the first layer, a third layer on the second layer, and a fourth layer comprising MTO on the third layer; and
   a magnetic recording layer structure on the fourth layer.

2. The magnetic recording medium of claim 1, wherein the third layer comprises a metal or an alloy.

3. The magnetic recording medium of claim 1, wherein the third layer comprises at least one of Pt or RuAl.

4. The magnetic recording medium of claim 1, wherein the third layer comprises PtZr or PtTa.

5. The magnetic recording medium of claim 1, wherein the third layer comprises at least one of Rh, Cr, FePt, or CrMo.

6. The magnetic recording medium of claim 1, wherein the third layer comprises RuAl and a thickness equal to or greater than 0.5 nanometers (nm) and less than or equal to 2.5 nm.

7. The magnetic recording medium of claim 1, wherein the first layer comprises a thickness equal to or greater than 0.9 nm and less than or equal to 2.7 nm; and
   wherein the fourth layer comprises a thickness equal to or greater than 0.9 nm and less than or equal to 2.7 nm.

8. The magnetic recording medium of claim 1, wherein the first layer and the fourth layer comprise a total thickness of about 3.6 nm.

9. The magnetic recording medium of claim 1, further comprising:
   an intermediate layer comprising RuAl, wherein the intermediate layer is directly on the heat sink layer and wherein the first layer is directly on the intermediate layer.

10. A data storage device comprising:
    the magnetic recording medium of claim 1; and
    a write head configured to write data to the magnetic recording medium and comprising a near field transducer (NFT) to generate localized heating in the magnetic recording medium during the writing.

11. The magnetic recording medium of claim 10, wherein the third layer comprises at least one of: RuAl, Pt, PtZr, PtTa, Rh, FePt, CrMo, or Cr.

12. A magnetic recording medium, comprising:
    a substrate;
    a heat sink layer on the substrate;
    a first MgOTiO (MTO) layer on the heat sink layer, wherein the first MTO layer comprises MTO;
    a first TiN layer directly on the first MTO layer, wherein the first TiN layer comprises TiN;
    a first middle thermal barrier layer directly on the first TiN layer;

a second MTO layer directly on the first middle thermal barrier layer, wherein the second MTO layer comprises MTO; and a magnetic recording layer structure on the second MTO layer.

13. The magnetic recording medium of claim 12, wherein the TiN in the first TiN layer includes a mixture of Ti that migrated from the first MTO layer and nitrogen (N2) gas residue.

14. The magnetic recording medium of claim 12, wherein the first middle thermal barrier layer comprises at least one of: RuAl, Pt, PtZr, PtTa, Rh, FePt, CrMo, or Cr.

15. The magnetic recording medium of claim 12, further comprising:

an intermediate layer including RuAl, wherein the intermediate layer is directly on the heat sink layer and the first MTO layer is directly on the intermediate layer.

16. The magnetic recording medium of claim 12, further comprising:

a second TiN layer directly on the second MTO layer, wherein the second TiN layer includes a mixture of Ti that migrated from the second MTO layer and nitrogen (N2) gas residue;

a second middle thermal barrier layer directly on the second TiN layer, wherein the second middle thermal barrier layer comprises at least one of: RuAl, Pt, PtZr, PtTa, Rh, FePt, CrMo, or Cr;

a third MTO layer directly on the second middle thermal barrier layer, wherein the third MTO layer includes MTO; and wherein the magnetic recording layer structure is on the third MTO layer.

17. A method for manufacturing a magnetic recording medium, the method comprising:

providing a substrate;

providing a heat sink on the substrate;

providing a first layer comprising MgOTiO (MTO) on the heat sink;

causing a reactive gas comprising N2 to flow in a chamber containing the first layer to form a second layer on the first layer, wherein the second layer comprises TiN;

providing a third layer on the second layer;

providing a fourth layer comprising MTO on the third layer; and providing a magnetic recording layer structure on the fourth layer.

18. The method of claim 17, wherein the TiN in the second layer includes Ti that migrated from the first layer and nitrogen (N2) gas residue.

19. The method of claim 17, wherein the third layer comprises at least one of: RuAl, Pt, PtZr, PtTa, Rh, FePt, CrMo, or Cr.

20. A magnetic recording medium formed using the method of claim 17.

* * * * *